(12) United States Patent
Miyazaki et al.

(10) Patent No.: US 6,483,266 B2
(45) Date of Patent: Nov. 19, 2002

(54) SENSORLESS MOTOR DRIVING APPARATUS

(75) Inventors: Shinichi Miyazaki, Suwa (JP); Akihiko Ikegami, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/908,433

(22) Filed: Jul. 18, 2001

(65) Prior Publication Data

US 2002/0050800 A1 May 2, 2002

(30) Foreign Application Priority Data

Jul. 19, 2000 (JP) .......................... 2000-219465

(51) Int. Cl.[7] .................. H02K 23/00; H02P 1/18; H02P 3/08; H02P 5/06; H02P 7/06
(52) U.S. Cl. ................ 318/254; 318/138; 318/439; 318/700; 318/701
(58) Field of Search .................. 318/138, 700–701, 318/716, 720–722, 254, 439

(56) References Cited

U.S. PATENT DOCUMENTS

| | | | | |
|---|---|---|---|---|
| 5,689,165 A | * | 11/1997 | Jones et al. | 318/254 |
| 5,844,385 A | * | 12/1998 | Jones et al. | 318/254 |
| 5,920,175 A | * | 7/1999 | Jones et al. | 318/254 |
| 5,998,946 A | * | 12/1999 | Kim | 318/138 |

* cited by examiner

Primary Examiner—Marlon T. Fletcher
(74) Attorney, Agent, or Firm—Harness, Dickey & Pierce, P.L.C.

(57) ABSTRACT

When the brushless motor 1 at rest is started, phase excitation is performed twice such that different phases are excited. A commutation reference point is set at a position at which a rotor has stopped after the second-time excitation. A position detector outputs pulse signals in response to a movement of an object driven by the brushless motor 1. The pulse signals output from the position detector are monitored and commutation is controlled on the basis of the number of pulse edges of the pulse signals as counted starting from the commutation reference point. For example, the number of pulse edges output during a period starting from the commutation reference point and ending at a point of time at which commutation should be performed is measured in advance. When the number of pulse edges with reference to the commutation reference point becomes equal to the above predetermined number, it is determined that commutation timing has reached, and commutation is performed.

15 Claims, 16 Drawing Sheets

SENSORLESS MOTOR DRIVING APPARATUS

1. Technical Field of the Invention

The present invention relates to an apparatus for driving a sensorless motor such as a brushless DC motor or a stepper motor, and more particularly, to an apparatus for driving a sensorless motor by controlling commutation by means of a position detector disposed on an object driven by the sensorless motor.

2. Description of the Related Art

In the prior art of motors using a permanent magnet on a rotor, such as a brushless DC motor or an HB-type stepper motor, it is known to detect the position of the rotor by detecting a counter electromotive force induced in a non-exciting phase (phase in which no current is passed) of stator coils.

That is, the counter electromotive voltage induced in a non-exciting coil is monitored, and the position of the rotor is detected by detecting a zero-crossing point at which the counter electromotive voltage crosses a neutral voltage point. In this technique, commutation is performed, for example, at a point at which the phase is shifted by 30° with respect to the zero-crossing point.

However, in this technique, when the rotor is at rest, no counter electromotive voltage is induced in the stator coil and thus sensorless driving is impossible. Therefore, when the motor whose rotor is at rest is started, the rotor is forcedly driven by performing forced commutation, and the operation is switched into a sensorless driving mode when the rotation speed has become high enough to induce a counter electromotive voltage greater than a predetermined value in the stator coil.

It is also known to provide a Hall device on a motor whereby the position of the rotor is detected thereby controlling the motor in a sensorless control method.

However, in the sensorless control on the basis of the counter electromotive voltage, commutation cannot be controlled in a low-speed range as described above, and thus this technique is unsuitable when the motor is frequently started and stopped. On the other hand, when a Hall device is used to control commutation, although control is possible in a low-speed range, the control accuracy is limited by factors such as a limited accuracy in the width of magnetic poles of the rotor and an installation position error of the Hall device, and thus the accuracy of controlling commutation is poorer than that obtained by the sensorless control on the basis of the counter electromotive voltage in a high-speed range in which the counter electromotive voltage can be detected. Thus, there is a need for a sensorless control method which allows a motor to be controlled precisely even in a low-speed range.

SUMMARY OF THE INVENTION

In view of the above problems in the conventional techniques, it is an object of the present invention to provide an apparatus for driving a sensorless motor, capable of controlling commutation in a precise and highly reliable fashion even in a low-speed range.

To achieve the above object, there is provided an apparatus for driving a sensorless motor, comprising: a position detector for outputting a pulse signal in response to movement of an object driven by a sensorless motor; commutation control means which counts the number of pulses output from the position detector and controls the commutation of the sensorless motor depending upon the counted value; and commutation reference point setting means for setting a commutation reference point employed as a reference point in the counting of the pulses; wherein, when the sensorless motor is started for the first time, the commutation reference point setting means performs phase excitation twice, switching the excited phase such that a pulled-in position resulting from the first-time excitation and that resulting from second-time excitation become different in electrical angle from each other by a magnitude not equal to either 180° or an integral multiple of 180°, and the commutation reference point setting means performs the setting of the commutation reference point when a rotor of the motor has stopped after the second-time excitation.

When the object driven by the sensorless motor moves, a pulse signal is output from the position detector in response to the movement of the object, and commutation is controlled on the basis of the counted number of pulses of the pulse signal. The commutation reference point, which is used as a reference point in counting the number of pulse signals, is set by the commutation reference point setting means on the basis of a position (pulled-in position) at which the rotor stops when a stator coil of the sensorless motor is excited for the first time.

In the case where excitation is performed only once, there is a possibility that, depending upon the position at which the rotor is at rest just before the sensorless motor is started for the first time, the rotor does not move in response to the excitation. However, if excitation is performed twice such that pulled-in positions become different in electrical angle from each other by a magnitude not equal to either 180° or an integral multiple of 180°, it is assured that the rotor moves. If the commutation reference point is set at the position at which the rotor stops after being pulled therein, the resultant commutation reference point becomes coincident with the position at which commutation should be performed during the rotation of the rotor.

Therefore, if the number of pulses is counted starting from the commutation reference point, and if commutation is performed each time the counted value becomes equal to an integral multiple of the predetermined number of pulses per commutation interval, commutation is correctly performed whenever the rotor comes to a position at which commutation should be performed.

The invention also provides a sensorless motor driving apparatus wherein the commutation reference point setting means sets the commutation reference point for each rotation direction of the sensorless motor, and wherein the commutation control means controls the commutation depending upon a present rotation direction in accordance with the number of pulses as counted starting from a commutation reference point set for the present rotation direction.

The invention also provides a sensorless motor driving apparatus wherein the commutation reference point setting means detects an offset value indicating the number of pulses corresponding to a difference in position between the commutation reference points set for the respective rotation directions of the sensorless motor, and wherein the commutation control means counts the pulses with respect to one of commutation reference points and corrects the counted value of pulses on the basis of the offset value each time the rotation direction is switched.

Commutation reference points are set for the respective rotation directions of the sensorless motor. In the case where the rotational motion of the sensorless motor is converted into the linear motion of a belt via a pulley thereby moving an object disposed on the belt, the absolute position of the rotor corresponding to a certain absolute position of the object becomes different depending upon the rotation direction, because the amount of expansion of the belt varies depending upon the rotation direction. When there is such a difference, if commutation is controlled on the basis of the counted value of pulses with reference to one commutation reference point set for one rotation direction, commutation timings determined on the basis of the counted value of pulses in the opposite direction become different from correct timings.

To avoid the above problem, commutation reference points are set for the respective rotation directions of the sensorless motor, and commutation is controlled, depending upon the present rotation direction, in accordance with the number of pulses as counted starting from the commutation reference point set for the present rotation direction, thereby preventing the commutation timings from shifting from the correct timings.

Herein, an offset value, which indicates the number of pulses corresponding to a difference in position between the commutation reference points set for the respective rotation directions of the sensorless motor, is detected, and the number of pulses is counted with respect to one of commutation reference points and the counted value of pulses is corrected on the basis of the offset value each time the rotation direction is switched so that the resultant number of pulses represents a correct number with respect to the commutation reference point for the corresponding rotation direction. In this case, it is not necessary to use two counting variables for the respective rotation directions.

The invention also provides a sensorless motor driving apparatus further comprising counter electromotive force detection means for detecting a counter electromotive force induced in a non-exciting phase of the sensorless motor; and commutation timing generating means for generating a commutation timing in accordance with the counter electromotive force detected by the counter electromotive force detection means, wherein commutation reference point setting means resets the commutation reference point at a point of time of the commutation timing generated by the commutation timing generating means.

The invention also provides a sensorless motor driving apparatus wherein the commutation timing generating means generates a commutation timing in accordance with the counter electromotive force of one of phases of the sensorless motor.

The counter electromotive force induced in the non-exciting phase, in which no current is passed, of the sensorless motor is detected by the counter electromotive force detection means. The position of the rotor is detected on the basis of the detected counter electromotive force, and a commutation timing is generated on the basis of the detected position of the rotor. At a point of time indicated by the generated commutation timing, resetting of the commutation reference point is performed.

The accuracy of the position of the rotor detected on the basis of the counter electromotive force is better than the accuracy of the position of the rotor detected on the basis of the pulled-in position where the rotor is pulled in by pulling-in excitation. That is, in the case where the rotor is pulled into a rest position by excitation, the rotor stops at a position slightly shifted from an electrical stable rest position, depending upon an external force such as a frictional force which is balanced with a torque generated by the motor. In contrast, the position of the rotor detected by the counter electromotive force does not include an error caused by the frictional force or the like.

In view of the above, when it becomes possible to generate a commutation timing on the basis of the counter electromotive force, the position of the rotor is detected more precisely on the basis of the counter electromotive force, and a commutation timing is generated on the basis of the detected position of the rotor, and resetting of commutation reference point is performed. After the resetting of the commutation reference point, the number of pulses is counted with respect to the commutation reference point, and commutation is performed on the basis of the counted value of pulses, and thus it is ensured that commutation is controlled more precisely.

In the conventional sensorless control technique on the basis of the counter electromotive force, it is necessary to sequentially detect counter electromotive forces of all phases and generate commutation timings for all phases. In contrast, the commutation timing generating means generates commutation timings on the basis of the counter electromotive force not of all phases of the sensorless motor but of one of the phases, and thus the counter electromotive force can be detected using a fewer number of circuits, and the commutation timing can be generated by simpler processing.

The invention also provides a sensorless motor driving apparatus wherein the commutation timing generating means generates a commutation timing for each rotation direction of the sensorless motor, and wherein the commutation reference point setting means resets the commutation reference points for the respective rotation directions in accordance with the corresponding commutation timings generated for the respective rotation directions.

The invention also provides a sensorless motor driving apparatus wherein the commutation reference point setting means detects an offset value indicating the number of pulses corresponding to a difference in position between the commutation reference points reset in accordance with the commutation timings generated for the respective rotation directions by the commutation timing generating means, and the commutation reference point setting means includes storage means for storing the offset value, and wherein the commutation control means counts pulses with respect to one of the reset commutation reference points and corrects the counted value of pulses on the basis of the offset value stored in the storage means each time the rotation direction is switched.

The commutation reference point setting means resets the commutation reference points on the basis of the commutation timings generated for the respective rotation directions by the commutation timing generating means. In the case where the rotational motion of the sensorless motor is converted into the linear motion of a belt via a pulley thereby moving an object disposed on the belt, the absolute position of the rotor corresponding to a certain absolute position of the object becomes different depending upon the rotation direction, because the amount of expansion of the belt varies depending upon the rotation direction. When there is such a difference, if commutation is controlled on the basis of the counted value of pulses with reference to one commutation reference point set for one rotation direction, commutation timings determined on the basis of the counted value of pulses in the opposite direction become different from correct timings.

To avoid the above problem, commutation timings are generated on the basis of the counter electromotive forces in the respective rotation directions, and resetting of the commutation reference points is performed for the respective rotation directions on the basis of the commutation timings generated, thereby preventing the commutation timings from shifting from the correct timings.

Herein, an offset value is detected which indicates the number of pulses corresponding to a difference in position between the commutation reference points set for the respective rotation directions of the sensorless motor, and the detected offset value is stored in the storage means. After resetting the commutation reference points, the number of pulses is counted with respect to one of the commutation reference points, and the counted value of pulses is corrected on the basis of the offset value stored in the storage means each time the rotation direction is switched, so that the corrected counted value represents the number with respect to the commutation reference point corresponding to the present rotation direction. In this case, it is not necessary to use two counting variables for the respective rotation directions.

The invention also provides a sensorless motor driving apparatus wherein when controlling of the sensorless motor is started, the commutation control means performs the resetting of a commutation reference point in accordance with a commutation timing generated by the commutation timing generating means.

The invention also provides a sensorless motor driving apparatus wherein when a predetermined period of time has elapsed since controlling of the sensorless motor was started, the commutation control means performs the resetting of a commutation reference point in accordance with a commutation timing generated by the commutation timing generating means.

The invention also provides a sensorless motor driving apparatus wherein each time a predetermined period of time elapses after controlling of the sensorless motor was started, the commutation control means performs the resetting of a commutation reference point in accordance with a commutation timing generated by the commutation timing generating means.

The invention also provides a sensorless motor driving apparatus wherein each time the sensorless motor is started, the commutation control means performs the resetting of a commutation reference point in accordance with a commutation timing generated by the commutation timing generating means.

The resetting of the commutation reference point on the basis of the commutation timing generated by the commutation timing generating means is performed when the control of the sensorless motor is started, and the commutation reference point is reset as soon as the rotation speed of the sensorless motor becomes high enough to generate a commutation timing on the basis of counter electromotive force. Therefore, the commutation reference point can be set precisely in early stage after starting the control of the sensorless motor.

If the resetting of the commutation reference point is performed when a predetermined period of time has elapsed since the control was started, more specifically, for example, if the resetting is performed when a change in the ambient temperature, which occurs after the sensorless motor is started, has reached an equilibrium state, the resetting of the commutation reference point is performed under a stable condition in terms of the ambient temperature. Furthermore, if the resetting of the commutation reference point is performed each time a predetermined period of time elapses after the control is started, the commutation reference point is properly set depending upon a change in the ambient temperature. Still furthermore, if the resetting of the commutation reference point is performed each time the sensorless motor is started, that is, each time the sensorless motor starts to rotate, the commutation reference point is correctly set depending upon the conditions when the sensorless motor is started.

DETAILED DESCRIPTION OF THE PREFERRED EMBODIMENTS

Embodiments of the present invention are described below with reference to the drawings.

A first embodiment of the present invention is first described below.

Figure 1:
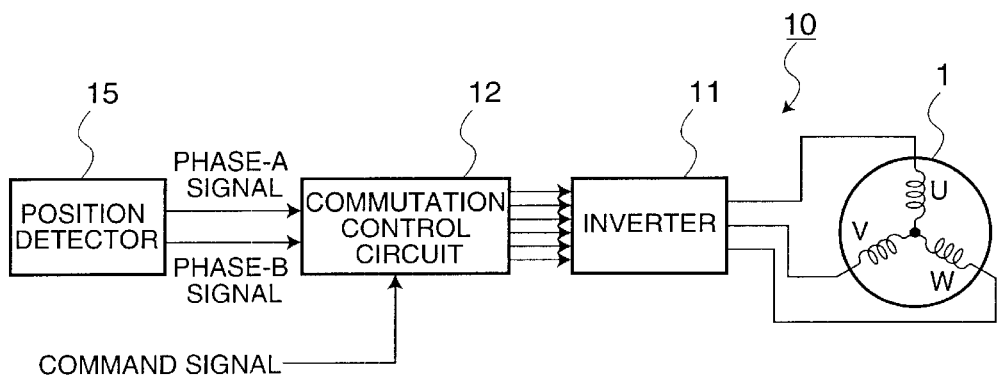
FIG. 1 is a schematic diagram of a driver circuit for driving a brushless motor, according to a first embodiment of the present invention.

FIG. 1 is a schematic diagram of a driver circuit 10 for driving a brushless motor 1, according to the present invention.

The brushless motor 1 is a 3-phase sensorless motor type having three star-connected stator coils of phases of U, V, and W. The driver circuit 10 includes an inverter 11, output terminals of which are connected to respective terminals of phases of U, V, and W of the brushless motor 1. The inverter 11 includes three pairs of transistors connected in a known manner to form three half-bridges, one for each phase. Each half bridge is composed of a series connection of two transistors connected between a power source terminal and ground. The turning-on/off of the six transistors in the inverter is controlled by a commutation signal supplied from a commutation control circuit 12 so that the respective phases of the brushless motor 1 are sequentially excited to rotate the rotor.

Figure 2:
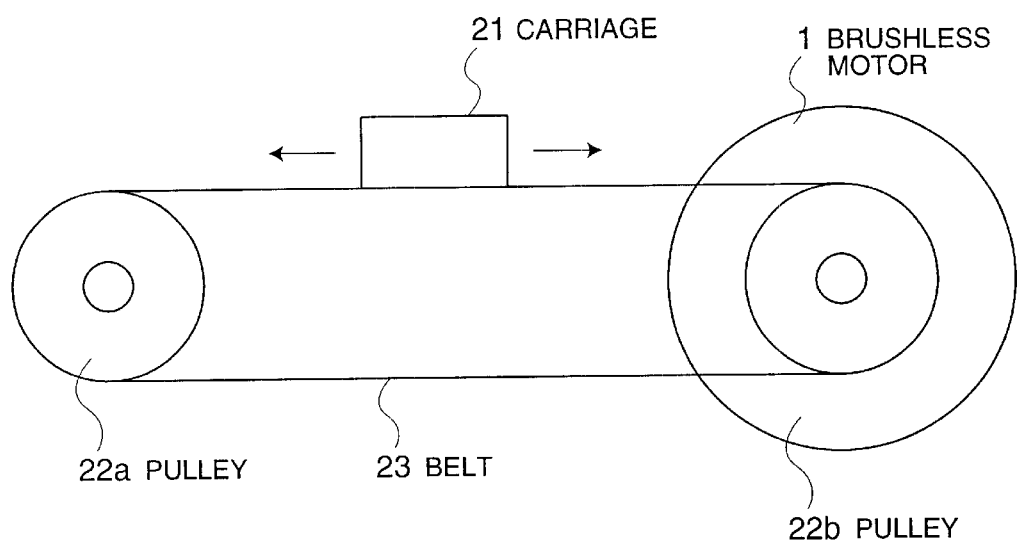
FIG. 2 is a schematic diagram of a system in which a carriage is driven by a sensorless motor.

The rotary shaft of the brushless motor 1 is connected to, for example, a carriage moving mechanism of a printer via a pulley. For example, as shown in FIG. 2, a carriage 21 is disposed on a belt 23 extending between two pulleys 22a and 22b such that the carriage 21 is moved via the belt 23 by transmitting a rotational force of the brushless motor 1 to one of pulleys 22b.

The carriage 21 includes a position detector 15 such as a linear encoder for detecting the position of the carriage, and the commutation of the brushless motor 1 is controlled on the basis of encoder pulses output from the position detector 15.

The commutation control circuit 12 includes, for example, a microcomputer and a storage device (storage means) for storing data such as a predetermined commutation constant T which will be described later. Two detection signals are output from the position detector 15 and applied to the commutation control circuit 12. When pulling-in is performed in initial excitation upon the brushless motor 1, the rotor is moved and is stopped at a pulled-in position. This pulled-in position is employed as a commutation reference point in determining commutation timings, and a cumulative value S, a count variable kept in commutation control circuit 12, is set to "0" when the rotor is pulled-in at this commutation reference point. Each time an encoder pulse edge is received from the position detector 15, the commutation constant T is added to or subtracted from the cumulative value S depending upon the rotation direction of the brushless motor 1, and the commutation timings are defined in accordance with the cumulative value S. The commutation constant T is equal to 1/M where M is the number of the encoder pulse edges during one commutation interval.

The commutation control circuit 12 has multiple commutation modes which indicate which of the transistors of the inverter 11 should be turned on, and the commutation control circuit 12 outputs a respective commutation signal in one-to-one correspondence with each commutation mode. The commutation mode, represented by a mode value, is properly switched in synchronization with the generated commutation timing (hereinafter, such switching will be referred to as commutation mode switching) so that excitation of the stator coils of phases U to W of the brushless motor 1 is properly switched and thus the brushless motor 1 rotates. As in the known method of driving the brushless motor, the commutation control circuit 12 measures, in real time, the speed or the position of the carriage on the basis of the encoder pulses output from the position detector 15 and superimposes a control signal such as a PWM signal upon the commutation signal thereby controlling the speed and the position of the carriage.

The commutation constant T is set as follows. The commutation constant T is accumulated M times. The resultant sum must be equal to one commutation interval. Therefore, the number of the encoder pulse edges output from the position detector 15 during one revolution of the brushless motor 1 is measured, and the measured number of the encoder pulse edges per revolution is divided by the number of times of commutation made switching during one revolution of the rotor thereby determining the number of the encoder pulse edges per commutation interval. The reciprocal (1/M) of the calculated number M of the encoder pulse edges per commutation interval is the commutation constant T.

The operation of the first embodiment is described below with reference to a flow chart illustrating an example of a processing flow performed by the commutation control circuit 12.

Figure 3:
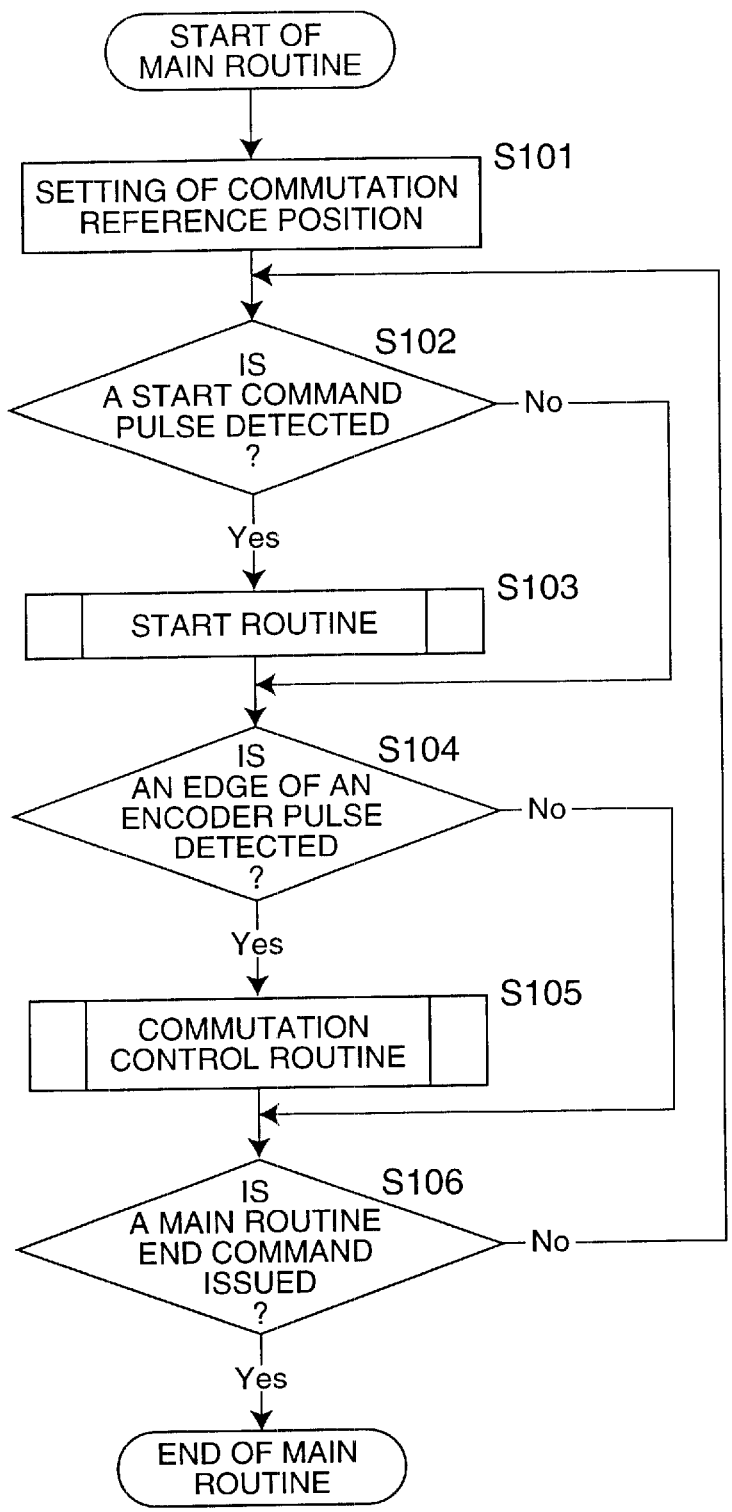
FIG. 3 is a flow chart illustrating an example of a main routine according to a first, second, and fourth embodiments.
Figure 4:
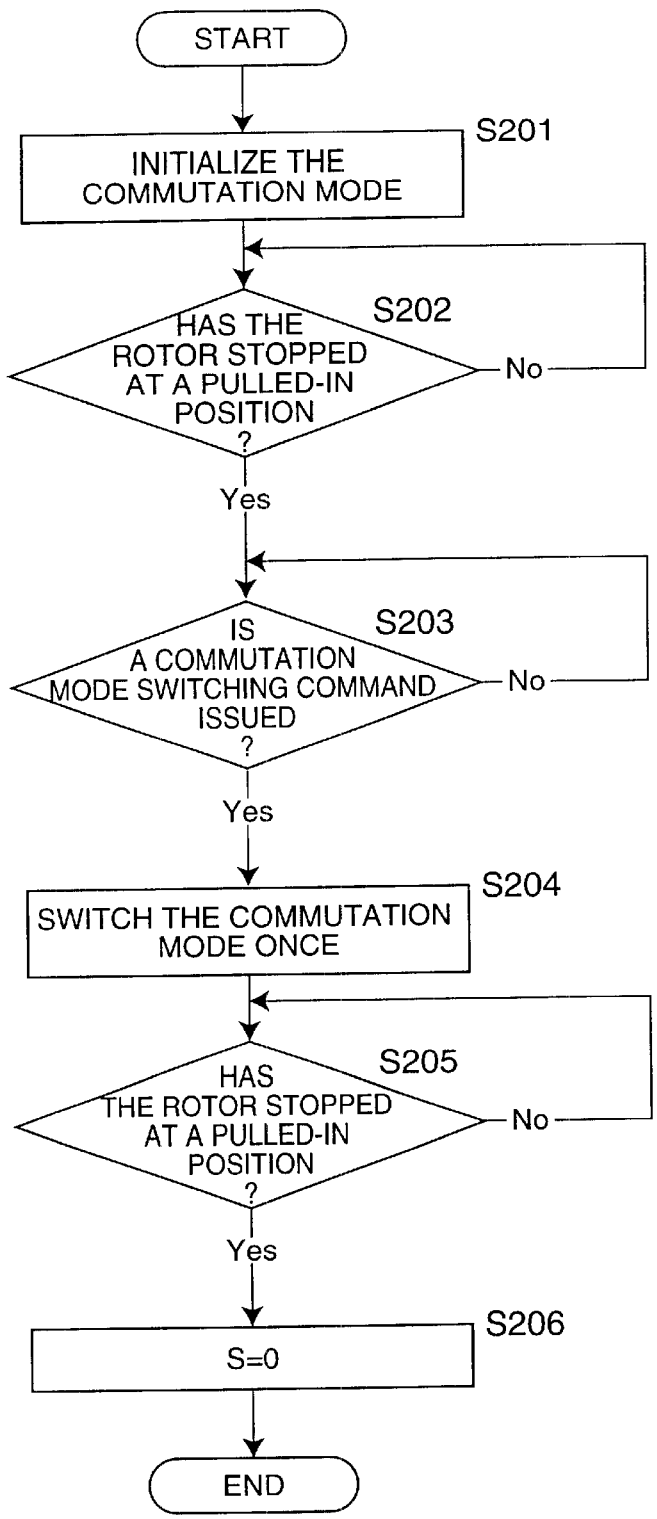
FIG. 4 is a flow chart illustrating an example of a commutation reference point setting routine according to the first, second, and fourth embodiments.

When the power switch of the printer is turned on and thus the control circuit 12 is activated, the commutation control circuit 10 first starts a main routine shown in FIG. 3. In a first step S101 in the main routine, setting of the commutation reference point is performed, wherein the details of this step are shown in FIG. 4. In this step, the commutation control circuit 12 performs an initial pulling-in operation to determine the commutation reference point. That is, first, in step S201, the commutation mode indicating a phase to be excited in the brushless motor 1 is initialized to a predetermined value. In response, as in the conventional known commutation control operation, a commutation signal for exciting a phase specified by the initialized commutation mode is generated and output to the respective transistors in the inverter 11 thereby controlling the respective transistors such that the specified phase is excited and thus performing a first-time pulling-in operation upon the rotor.

In the following step S202, it is determined whether the rotor has stopped. If the rotor has stopped, the routine goes to step S203. In step S203, it is determined whether a commutation mode switching command has been issued from an upper-level device. If no commutation mode switching command is detected, the routine waits in step S203 until a commutation mode switching command is received. If a commutation mode switching command has been issued, the routine goes to step S204, and the commutation mode is switched in a similar manner as is performed in the conventional commutation control operation. As a result, second-time pulling-in of the rotor is performed by exciting another phase of the motor as specified by the new commutation mode. In the following step S205, it is determined whether the rotor has stopped. When it is determined in step S205 that the rotor has stopped, the routine goes to step S206. In step S206, the position where the rotor is currently at rest is employed as the commutation reference point, and the cumulative value S is set to 0, that is, S=0. If the commutation reference point setting routine shown in FIG. 4 is completed, the routine returns to the main routine shown in FIG. 3 and goes to step S102.

Figure 6:
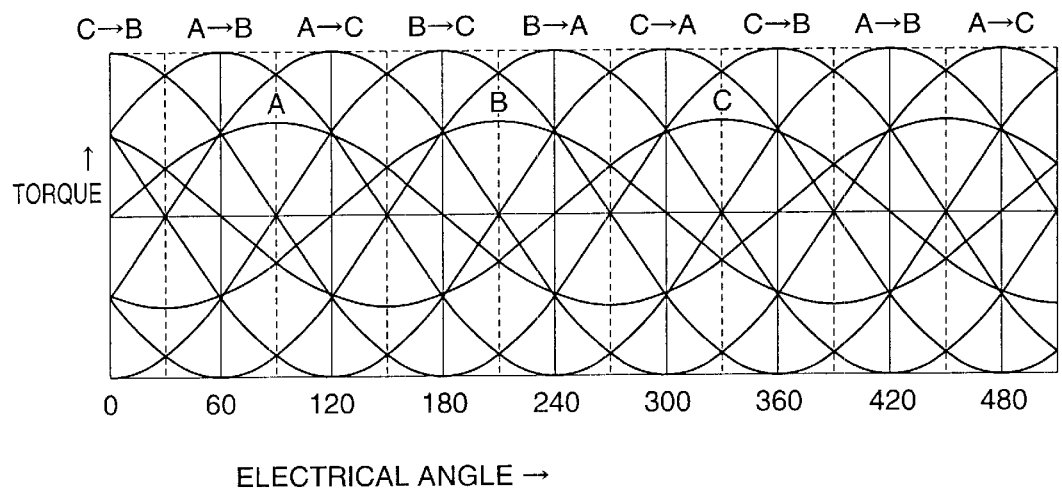
FIG. 6 is a diagram illustrating excited phases and torque varying with the change in the position of a rotor.

The movement of the rotor during the commutation reference point setting routine is described below. FIG. 6 illustrates the torque of the respective excited phases varying with the change in the position of the rotor of the brushless motor 1. For example, when the rotor is at a position at which the electrical angle becomes equal to 180°, if the initial value of the commutation mode is set such that a current flows from the phase-B to the phase-C, the rotor is rotated in a direction toward greater angles in FIG. 6 until reaching a position of 270°. Herein, if the commutation mode is switched such that a current flows from the phase-B to the phase-A, the rotor is further rotated toward a position of 330°.

In the first-time excitation, the rotor does not move in particular cases. There are two possibilities. A first possibility is that excitation is performed when the rotor is at rest at a position shifted by an electrical angle of 180° from a first-time pulled-in position. In this case, the rotor receives torques in both directions, and the magnitudes of the torques are equal in the right and left directions. Thus, the torques are balanced and the rotor does not move. For example, in FIG. 6, when the rotor is at rest at a position of 90°, if the initial value of the commutation mode is set such that a current flows from the phase-B to the phase-C, the rotor will be pulled in and stop at a position of 270° which is different in electrical angle by 180° from the first-time pulled-in position, but the torques are balanced and the rotor cannot move. Such a position is called an "unstable rest position". Because the unstable rest position is different from a "stable rest position" which is a right position into which the rotor should be pulled by the first-time excitation, if the commutation reference point is set at that wrong position, commutation will be performed at wrong positions in the following operation. This problem can be avoided if excitation is performed twice such that pulled-in positions become different in electrical angle from each other by a magnitude not equal to either 180° or an integral multiple of 180°. In this case, even if the rotor is pulled by the first-time excitation into a wrong position different in electrical angle by 180° from a correct pulled-in position, when second-time excitation is started, the rotor is at a position other than a position shifted in electrical angle by 180° or an integral multiple of 180° from a second-time pulled-in position, and thus the rotor is assured to move. For example, when first-time excitation cannot move the rotor which is at rest at the position of 90°, if second-time excitation is performed such that a current flows from the phase-B to the phase-A, the rotor is pulled into a position of 330°. That is, the rotor receives a torque in a direction toward smaller angles in FIG. 6 and thus is pulled into the position of the 330°. Note that, in the diagram shown in FIG. 6 in which electrical angle is represented along the horizontal axis, the position of 90° is equivalent to a position of 450°. After the rotor has stopped at the pulled-in position, if that pulled-in position is employed as the commutation reference point, the resultant commutation reference point is set to a correct position at which commutation should be performed during rotation.

Therefore, if this commutation reference point is employed as a count reference point, and if the encoder pulse edges are counted with reference to this count reference point, and commutation is performed each time the count value becomes equal to an integral multiple of the predetermined number of the encoder pulse edges per commutation interval, commutation is correctly performed whenever the rotor comes to a position at which commutation should be performed.

The second possibility for the rotor to become impossible to move in response to first-time excitation is discussed below. In FIG. 6, when excitation is performed such that a current flows from the phase-B to the phase-C, if the rotor is near a position of 270° such as a position of 260°, and if the torque applied to the rotor is smaller than a frictional torque applied to the rotary shaft of the motor, the rotor does not move. However, in the case where the rotor does not move when first-time excitation is performed such that a current flows from the phase-B to the phase-C, if the commutation mode is switched in second-time excitation such that a current flows from the phase-B to the phase-A, the rotor receives a torque in the direction toward greater angles in FIG. 6, and thus the rotor is rotated until it is pulled into a position of 330°.

That is, in the case where excitation is performed only once, there is a possibility that, depending upon the position at which the rotor is at rest, the rotor does not move to a correct pulled-in position. However, if excitation is performed twice switching the excited phase such that pulled-in positions become different in electrical angle from each other by a magnitude not equal to either 180° or an integral multiple of 180°, the rotor is assured to be moved at least by the second-time excitation even if it is not moved by the first-time excitation. After the rotor has stopped at the pulled-in position, that pulled-in position is employed as the commutation reference point, and the cumulative value S is set to 0, that is, S=0.

Herein, the first-time excitation and the second-time excitation should be different in phase by a magnitude not equal to either 180° or an integral multiple of 180° in electrical angle. More specifically, in the case of a 3-phase motor, the difference in phase may be 60°, 120°, 240°, or 270°.

Figure 5:
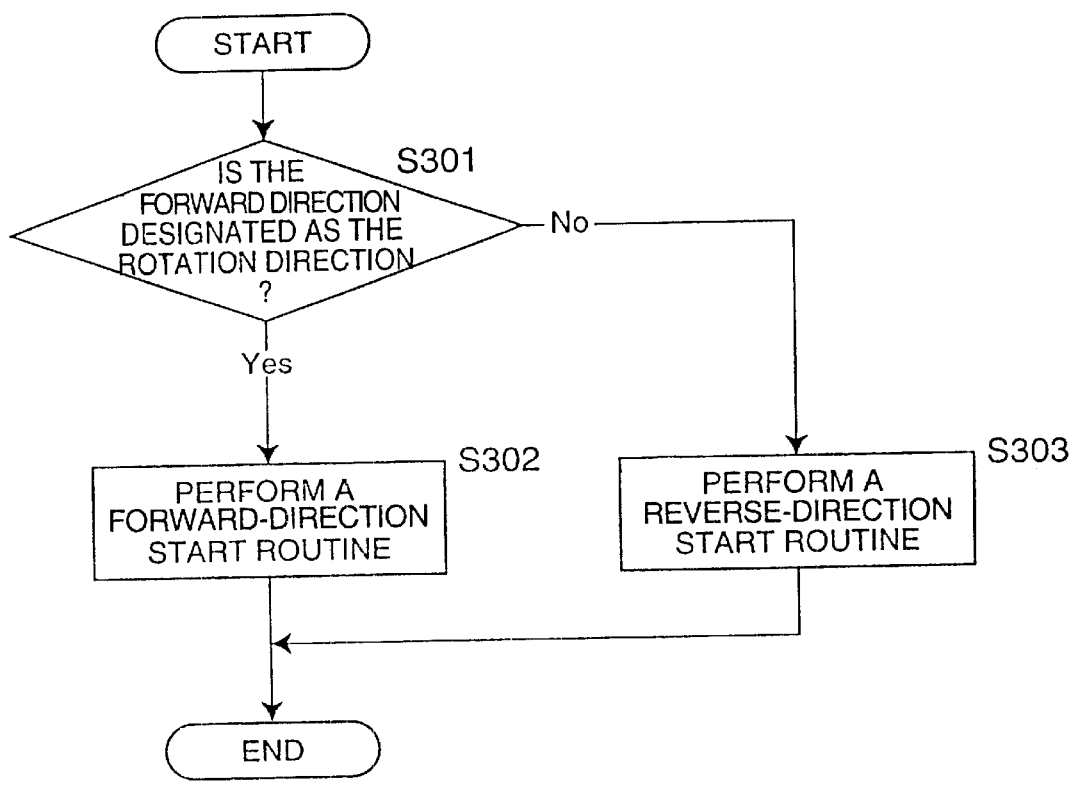
FIG. 5 is a flow chart illustrating an example of a start routine.

Once the commutation reference point has been set to a correct position and the cumulative value S has been set to the initial value equal to 0, it is possible to correctly control the commutation of the brushless motor 1 in the following operation. If, in step S102, a motor start command is received from the higher-level device, the routine goes to step S103 to perform a start routine the details of which are shown in FIG. 5. In FIG. 5, in a first step S301 in the start routine, a rotation direction designated by the higher-level device is detected. If the rotation is designated to be in a forward direction, a forward-direction start routine is performed in which the excitation phase is switched into the forward direction (step S302). In the case where the rotation is designated to be in a reverse direction, a reverse-direction start routine is performed in which the excitation phase is switched in the reverse direction (step S303). Thereafter, the routine returns to the main routine shown in FIG. 3 and goes to step S104. After completion of the start routine in step S103, if the brushless motor 1 rotates, the rotational force thereof is transmitted to the carriage 21 via the pulley 22b, and the carriage 21 is moved. As the carriage 21 moves, the position detector 15 disposed on the carriage 21 outputs two types of encoder pulse signals of which phases are different from each other.

Figure 7:
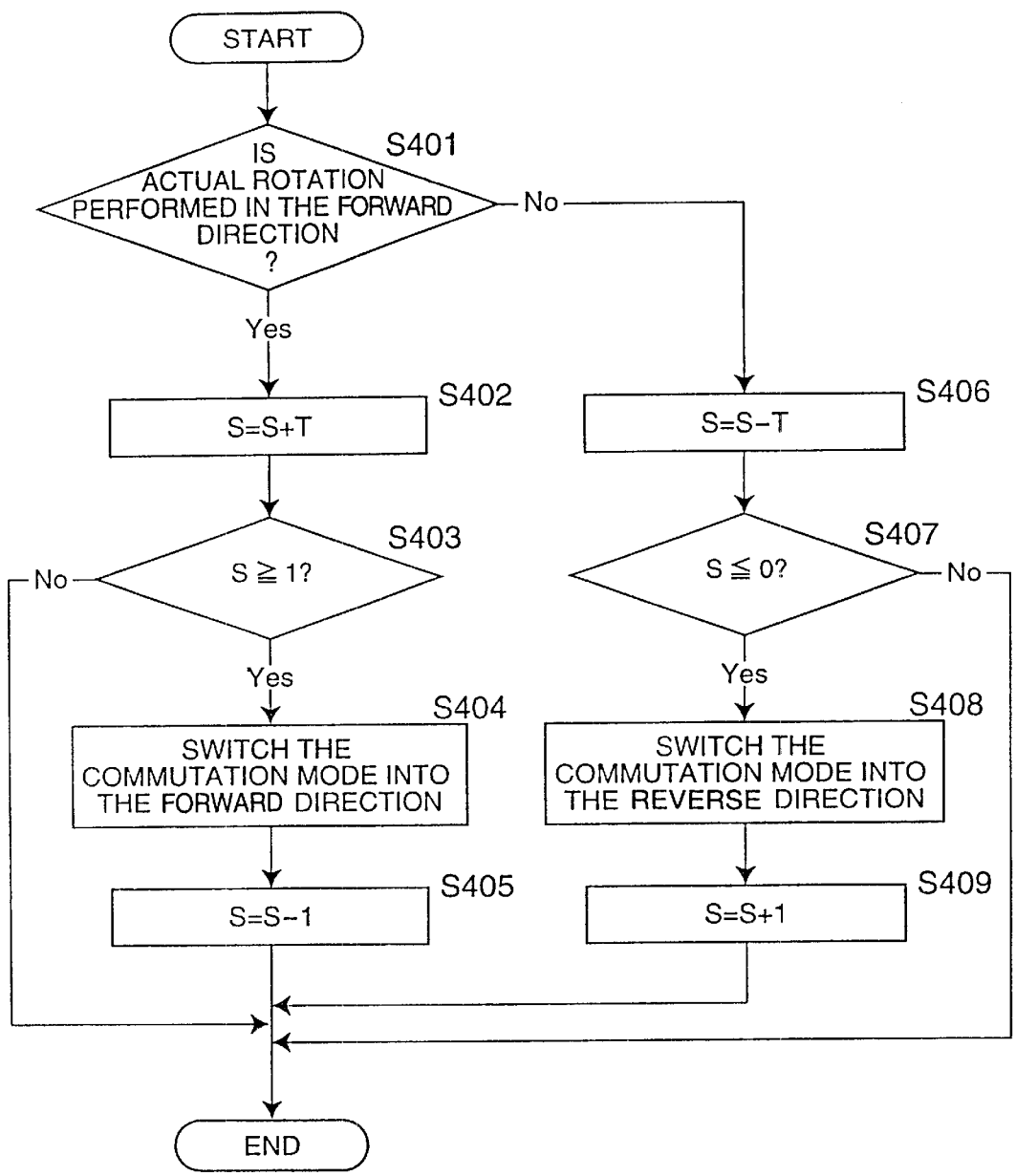
FIG. 7 is a flow chart illustrating an example of a commutation control routine according to the first and a second embodiment.

If an edge of a pulse signal output from the position detector 15 is detected in step S104, the routine goes to step S105 to perform a commutation control routine the details of which are shown in FIG. 7. In the commutation control routine shown in FIG. 7, it is first determined, from the two pulse signals, whether the brushless motor 1 is rotating in the forward or reverse direction (step S401). In the case where the rotation is in the forward direction, the routine goes from S401 to S402. In step S402, the commutation constant T, which has been set in advance and stored in a predetermined storage area, is added to the cumulative value S. Thereafter, the routine goes to step S403, and it is determined whether the cumulative value S is equal to or greater than 1. If the cumulative value S is smaller than 1, the commutation control routine is ended.

In the case where it is determined in step S403 that the cumulative value S is equal to or greater than 1, the routine goes to step S404, and the commutation mode is switched with correct timing in the forward direction. Thereafter, in step S405, the cumulative value S is decremented by "1", and the commutation control routine is ended.

On the other hand, if it is determined in step S401 that the brushless motor 1 is rotating in the reverse direction, the routine goes from step S401 to step S406 and the commutation constant T is subtracted from the cumulative value S. Thereafter, in step S407, it is determined whether the cumulative value S is equal to or smaller than "0". If the cumulative value S is greater than "0", the commutation control routine is ended.

If it is determined in step S407 that the cumulative value S is equal to or smaller than "0", the routine goes to step S408, and the commutation mode is switched with correct timing in the reverse direction. Thereafter, in step S409, the cumulative value S is incremented by "1", and the commutation control routine is ended.

If the commutation control routine shown in FIG. 7 is completed in the above-described manner, the routine returns to the main routine shown in FIG. 3 and goes to step S106. In step S106, it is determined whether a main routine end command has been issued from the higher-level device as a result of, for example, turning-off of the power switch of the printer. If the main routine end command has been issued, the main routine shown in FIG. 3 is ended. However, if the main routine end command has not been issued, the routine returns to step S102.

Thereafter, steps S102→S104→S105→S106 are performed repeatedly. In this iteration, each time an edge of an encoder pulse is detected, the commutation constant T is added to or subtracted from the cumulative value S depending upon the actual rotation direction, and commutation is performed each time the cumulative value S becomes equal to or greater than "1" as a result of addition or becomes equal to or smaller than "0" as a result of subtraction. When the carriage 21 is at rest, steps S102→S104→S106 in the main routine shown in FIG. 3 are performed repeatedly. When a start command to move the carriage 21 in a reverse direction is issued from the higher-level device, the routine goes from step S102 to step S103, and the commutation control operation is performed in the above-described manner.

In the first embodiment, as described above, when the commutation reference point is set, excitation is performed twice such that the pulled-in positions of the first-time and second-time excitation become different in electrical angle by a magnitude not equal to either 180° or an integral multiple of 180°. This ensures that the rotor is moved to a pulled-in position regardless of the position at which the rotor is rest before being pulled in. Thus, it is ensured that the cumulative value S is set to "0" precisely at the commutation reference point.

The commutation constant T is calculated from the amount of rotation of the motor per encoder pulse, and the commutation constant T is added to or subtracted from the cumulative value S depending upon the rotation direction each time each edge of the encoder pulse signals is detected as the brushless motor 1 rotates. In the case the commutation constant T is added to the cumulative value S, each time the cumulative value S becomes equal to or greater than "1" as a result of addition, commutation is performed and "1" is subtracted from the cumulative value S. Conversely, the commutation constant T is subtracted from the cumulative value S, each time the cumulative value S becomes equal to or smaller than "0" as a result of subtraction, commutation is performed and "1" is added to the cumulative value S. Thus, it becomes possible to precisely control commutation regardless of the rotation speed of the brushless motor 1. Besides, an increase in the order of magnitude of the cumulative value S is prevented, and thus the calculation of the cumulative value S can be performed with a small capacity counting means.

A second embodiment of the present invention is described below.

Figure 8:
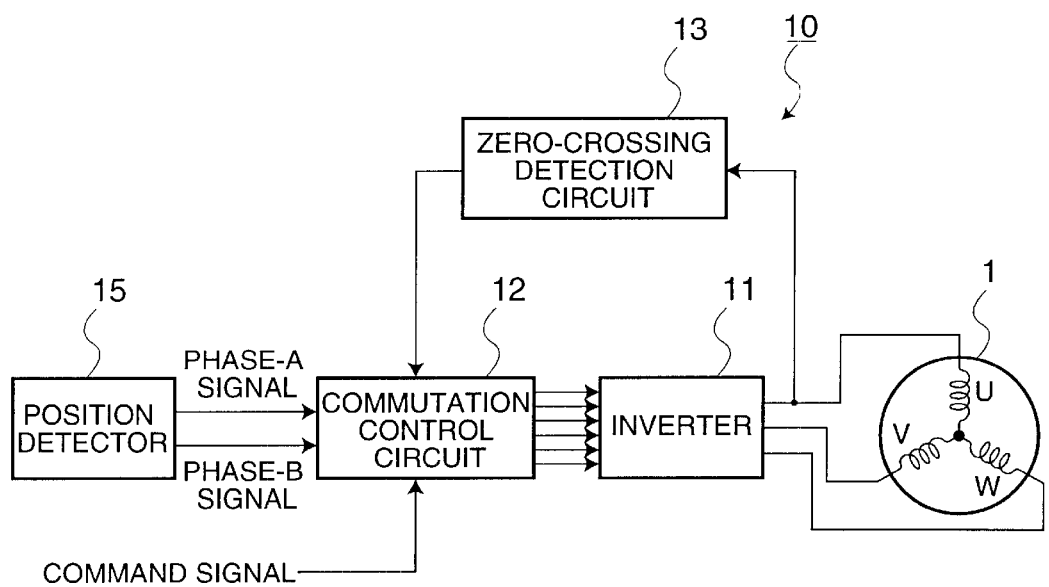
FIG. 8 is a diagram illustrating a configuration of a sensorless motor driver circuit according to the second and fourth embodiments.

As shown in FIG. 8, the second embodiment is similar to the first embodiment described above except that the driver circuit 10 additionally includes a zero-crossing detection circuit 13 serving as counter electromotive force detection means and that the commutation control circuit 12 operates differently. Thus, similar parts to those in the first embodiment are denoted by similar reference numerals, and they are not described in further detail herein.

The zero-crossing detection circuit 13, formed of a comparator or the like, monitors a counter electromotive voltage in one of phases of the motor 1. If the zero-crossing detection circuit 13 detects a mid-point voltage of the counter electromotive voltage, that is, if it detects a zero-crossing point, the zero-crossing detection circuit 13 discriminates the polarity of the counter electromotive voltage immediately before the zero-crossing point. If that polarity is positive, the zero-crossing detection circuit 13 outputs a high-level signal to the commutation control circuit 12, while a low-level signal is output if the polarity is negative.

The commutation control circuit 12 switches the commutation mode in accordance with the cumulative value S in a similar manner as in the first embodiment. When the rotation speed of the brushless motor 1 has become high enough to generate a commutation timing on the basis of the zero-crossing of the counter electromotive voltage, the commutation control circuit 12 generates a commutation timing on the basis of detection of zero-crossing and resets the commutation reference point on the basis of the commutation timing.

That is, in this second embodiment, when the power switch of the printer is turned on and thus the control circuit 10 is activated, the commutation control circuit 12 first starts the main routine shown in FIG. 3 as in the first embodiment. In a first step S101 in the main routine, as in the first embodiment, the commutation reference point setting routine, the details of which are shown in FIG. 4, is performed. After setting the commutation reference point and setting the cumulative value S to 0 such that S=0, the routine goes to step S102. If, in step S102, a command to start the brushless motor 1 is received from the higher-level device, the routine goes to step S103 to perform the start routine shown in FIG. 5 in a similar manner as in the first embodiment. As a result, the brushless motor 1 rotates and the rotational force thereof is transmitted to the carriage 21 via the pulley 22b, and thus the carriage 21 is moved. As the carriage 21 moves, the position detector 15 disposed on the carriage 21 outputs two types of the encoder pulse signals of which phases are different from each other.

Figure 9:
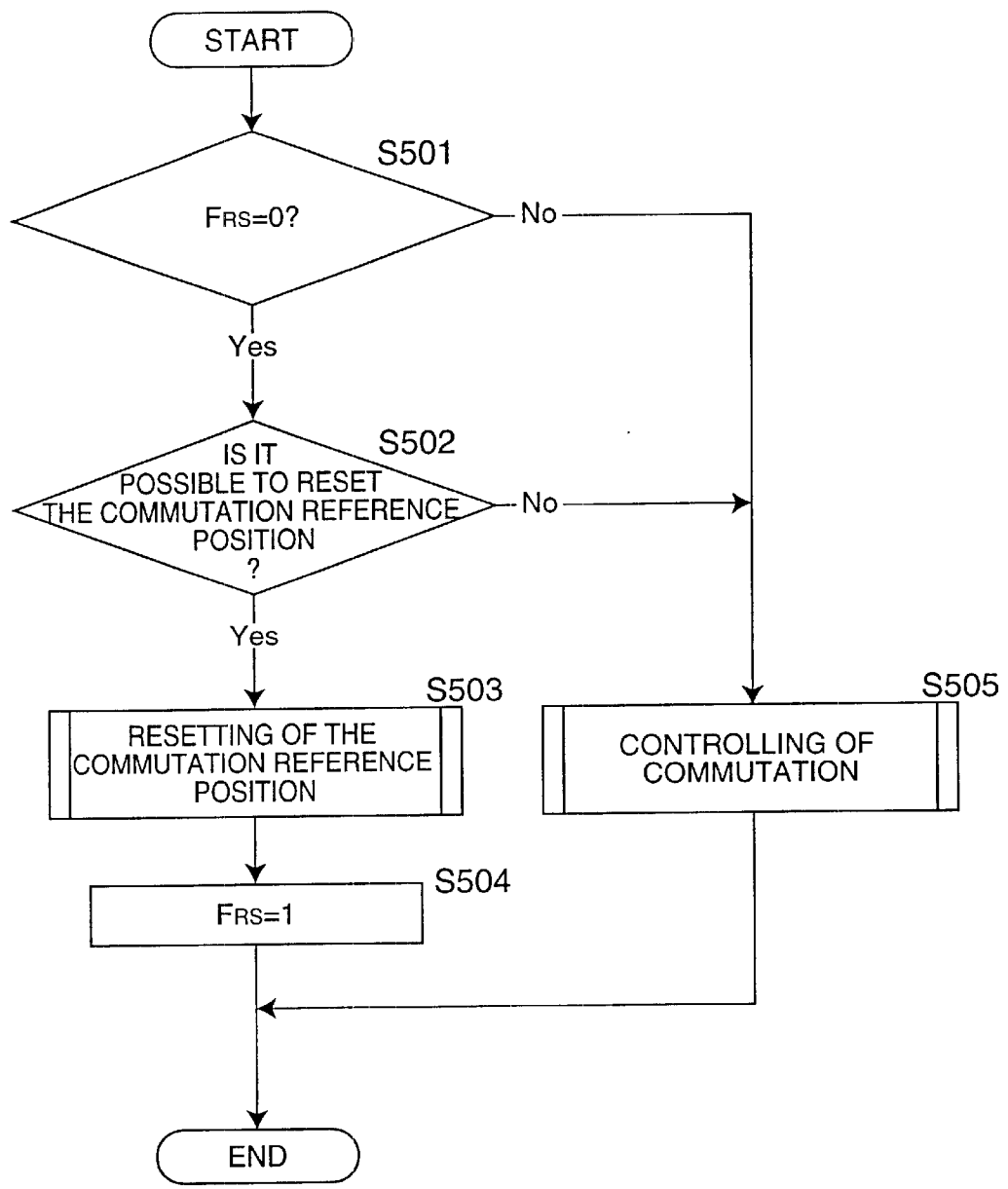
FIG. 9 is a flow chart illustrating an example of a commutation control routine according to the second embodiment.

If an edge of a pulse signal output from the position detector 15 is detected in step S104, the routine goes to step S105 to perform a commutation control routine the details of which are shown in FIG. 9. In a first step S501 of the commutation control routine shown in FIG. 9, it is determined whether a commutation reference point reset flag FRS has a value of "0". If FRS=0, the routine goes to step S502. Note that the commutation reference point reset flag FRS has a value equal to "1" when resetting of the commutation reference point has been completed, while the commutation reference point reset flag FRS has a value equal to "0" when resetting of the commutation reference point has not been completed. In an initial state after the brushless motor 1 is started, FRS is set to "0".

In step S502, it is determined whether resetting of the commutation reference point is possible, that is, it is determined whether the rotation speed of the brushless motor 1 is within a range which allows a commutation timing to be generated in accordance with a counter electromotive voltage. The determination may be performed, for example, on the basis of the number of pulses per unit time. In the case where resetting of the commutation reference point is not possible, that is, in the case where the rotation speed of the brushless motor 1 is low, the routine jumps from step S502 to step S505, and the commutation control routine shown in FIG. 7 is performed.

That is, if the rotation is in the forward direction, the routine goes from step S401 in FIG. 7 to step S402. In step S402, the predetermined commutation constant T is added to the cumulative value S each time each edge of the encoder pulse signals is detected. When the cumulative value S has become equal to or greater than "1", the routine goes from step S403 to step S404, and the commutation mode is switched. Thereafter, in step S405, "1" is subtracted from the cumulative value S.

Figure 10:
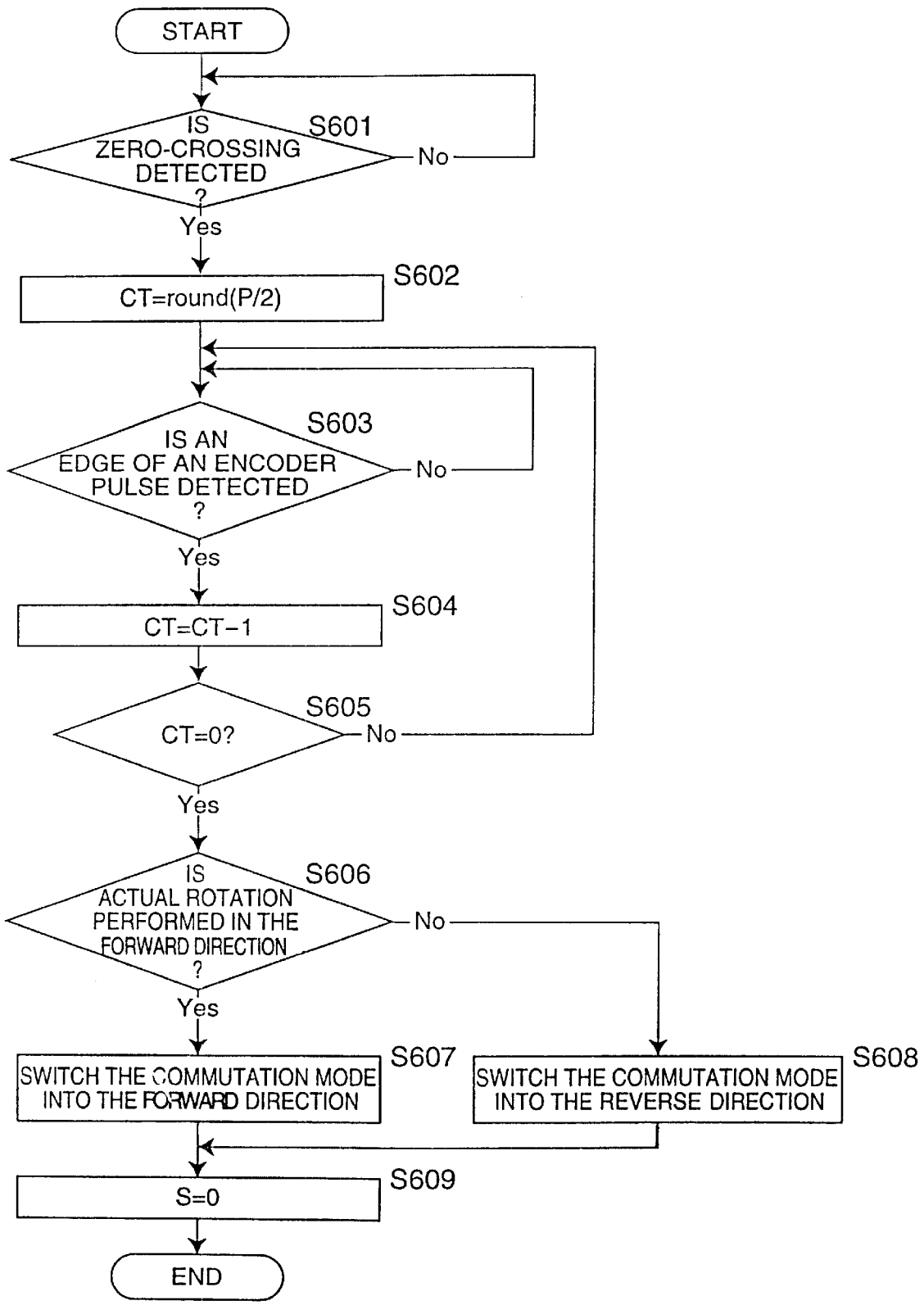
FIG. 10 is a flow chart illustrating an example of a commutation reference point resetting routine according to the second and fourth embodiments.

When the rotation speed of the brushless motor 1 has increased to a level high enough to detect a counter electromotive voltage, the routine goes from step S502 to S503 to perform a commutation reference point resetting routine the details of which are shown in FIG. 10.

In a first step S601 in the commutation reference point resetting routine shown in FIG. 10, it is determined whether the zero-crossing detection circuit 13 has detected zero-crossing of the counter electromotive voltage. If zero-crossing has been detected, the routine goes to step S602. In step S602, the count value CT is set to one-half the number of the encoder pulse edges output from the position detector 15 during one commutation interval. More specifically, for example, the count value CT is set to an integer given by round (P/2), that is, an integer obtained by rounding M/2 where M is the number of the encoder pulse edges per commutation interval detected when the commutation constant T is calculated.

Thereafter, the routine goes to step S603. In step S603, if each edge of the encoder pulse signals output from the position detector 15 is detected, the routine goes from step S603 to step S604, and the count value CT is decremented by "1". Thereafter, in step S605, it is determined whether the count value CT is equal to "0". If the count value CT is not equal to "0", the routine returns from step S605 to S603 and waits until a next arrival edge of the encoder pulse signals is detected. If the count value CT becomes equal to 0, it is determined that a timing of commutation has been reached, and the routine goes to step S606. That is, when one-half of one commutation interval has elapsed since the zero-crossing of the counter electromotive force was detected, that is, at a point of time at which a delay of 30° in electrical angle occurs with respect to the zero-crossing, it is determined that a timing of commutation has been reached. In step S606, it is determined whether the rotation is in the forward direction. If the rotation is in the forward direction, the routine goes to step S607, and the commutation mode is switched in the forward direction. Thereafter, the routine goes to step S609. However, if it is determined in step S606 that the rotation is in the reverse direction, the routine goes from step S606 to step S608, and the commutation mode is switched in the reverse direction. Thereafter, the routine goes to step S609. In step S609, it is determined that the commutation reference point has been correctly reset, and the cumulative value S is reset to "0". Thus, the commutation reference point resetting routine is completed. Thereafter, the routine returns from FIG. 10 to FIG. 9. In FIG. 9, the routine goes from step S503 to step S504, and the commutation reference point reset flag FRS is set to "1".

In the following operation, because the commutation reference point reset flag FRS has a value equal to 1, each time each edge of the encoder pulse signals is detected in step S104 in FIG. 3, the routine goes from step S501 in FIG. 9 to step S505, and the commutation control routine shown in FIG. 7 is performed in a similar manner to the first embodiment described above. That is, the commutation mode is switched in accordance with the cumulative value S which is updated in response to rotation.

Thus, in the second embodiment, advantages similar to those obtained in the first embodiment described above are obtained. Besides, in the second embodiment, because, at a point of time at which a period of time corresponding to one-half the unit commutation interval has elapsed since the zero-crossing, that is, at a point of time at which a delay of 30° in electrical angle occurs with respect to the zero-crossing, commutation timing is generated and the cumulative value S is reset, that is, the commutation reference point is reset, even if a relative large error occurs in the commutation reference point which is set in step S101 when the brushless motor 1 is started for the first time, once the commutation reference point is reset in step S503, the error of the commutation reference point with respect to the position of the rotor, that is, the commutation timing error, falls within a small range corresponding to one interval of the encoder pulse edges output from the position detector 15. Thus, the accuracy of the commutation timing is further improved. This makes it possible to reduce a torque ripple and a fluctuation of the rotation speed during a fixed-speed operation.

A third embodiment of the present invention is described below.

The third embodiment is similar to the first embodiment except that the commutation control circuit 12 operates differently, and thus, similar parts to those in the first embodiment are denoted by similar reference numerals, and they are not described in further detail herein.

In the third embodiment, there are two commutation reference points, one of which is used when the carriage 21 is moved in the right direction, and the other one of which is used when the carriage 21 is moved in the left direction. The two commutation reference points are set when the carriage 21 is at a predetermined position for setting the communication reference points. In this specific embodiment, the position for setting the communication reference points is selected near the center of the belt 23.

Figure 11:
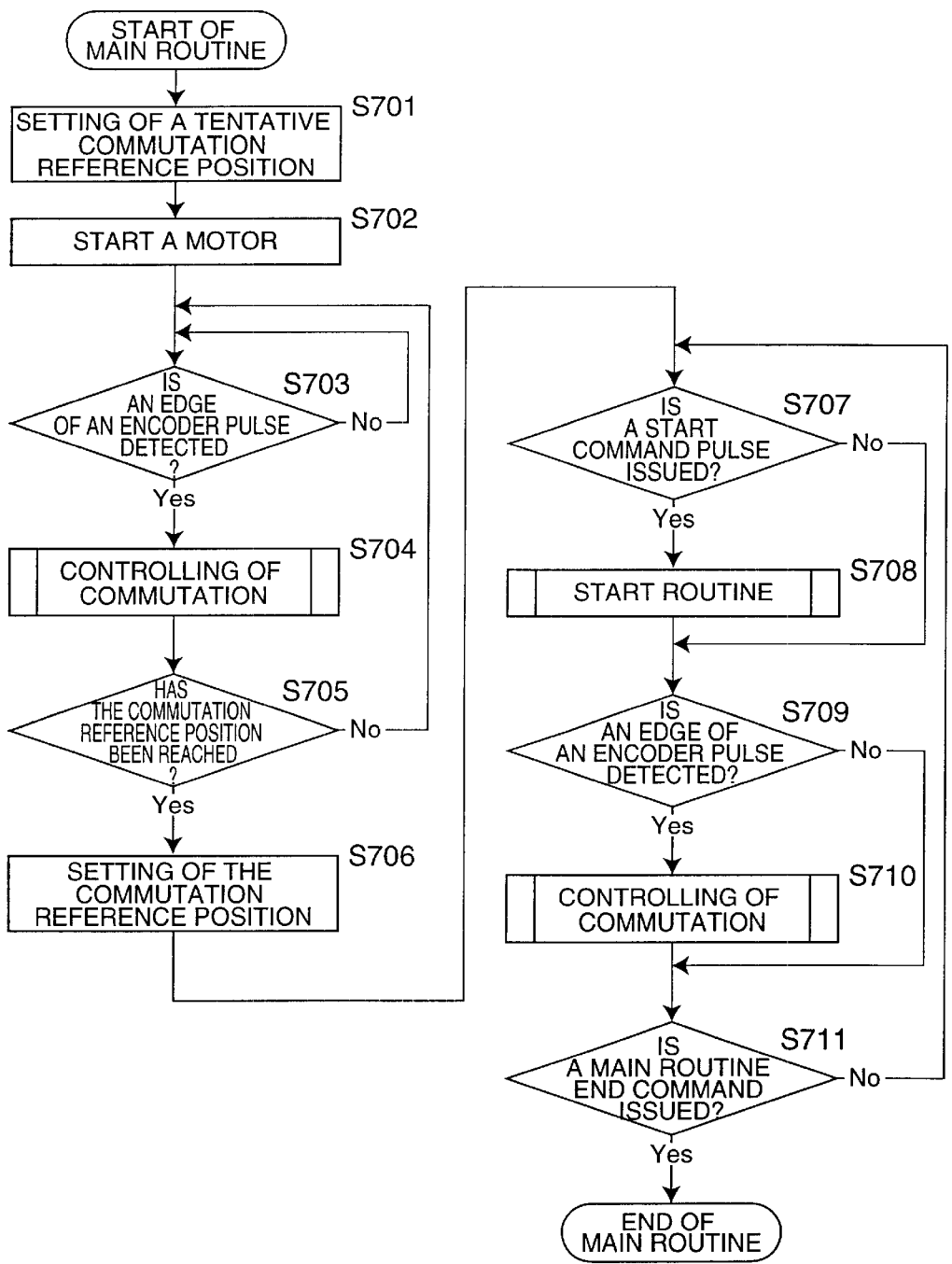
FIG. 11 is a flow chart illustrating an example of a main routine according to a third embodiment.

When the power switch of the printer is turned on and thus the control circuit 10 is activated, the commutation control circuit 12 starts a main routine shown in FIG. 11. First, in step S701, a tentative commutation reference point is set for use in moving the carriage 21 to the position for setting the actual commutation reference points. In the setting of the tentative commutation reference point in step S701, the setting is performed in a similar manner to the commutation reference point setting routine described above with reference to FIG. 4. Thereafter, in step S702, the brushless motor 1 is operated so as to move the carriage 21 toward the position where the actual commutation reference points are set. If, as a result of the movement of the carriage 21 driven by the brushless motor 1, an edge of a pulse signal output from the position detector 15 is detected in step S703, the routine goes to step S704 to perform the commutation control routine the details of which are shown in FIG. 7. In step S705, it is determined whether the carriage 21 has reached the position where the actual commutation reference points are set. If not, the routine returns to step S703, and steps S703 to S705 are performed repeatedly until the carriage 21 reaches the position where the actual commutation reference points are set. If it is determined in step S705 that the carriage 21 has reached the position where the actual commutation reference points are set, the routine goes to step S706. Herein, the value of the commutation mode at the end of step S704, that is, at the end of the commutation control routine shown in FIG. 7, is maintained, and thus the rotor of the brushless motor 1 stops at the pulled-in position defined in that commutation mode. In step S706, a commutation reference point setting routine is performed as shown in FIG. 12.

Figure 12:
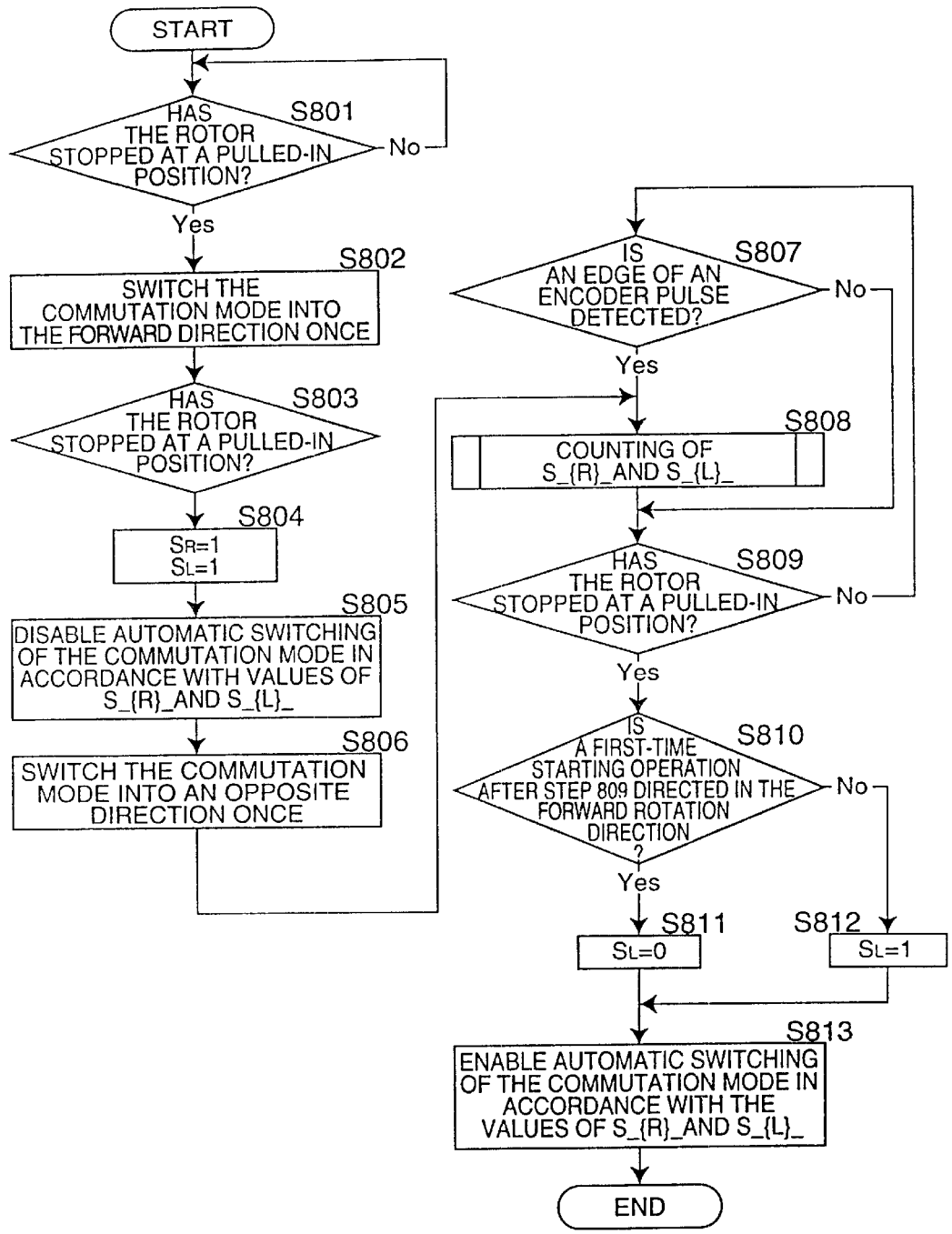
FIG. 12 is a flow chart illustrating an example of a commutation reference point setting routine according to the third embodiment.

In a first step S801 in the commutation reference point setting routine shown in FIG. 12, it is determined whether the rotor of the brushless motor 1 has stopped at the pulled-in position. If it is determined in step S801 that the rotor has stopped at the pulled-in position, the routine goes to step S802, and the commutation mode is forcedly switched once into the forward direction (in a direction which causes the carriage 21 to move to the right, in this specific example). Thereafter, the routine goes to step S803. In step S803, it is determined whether the rotor of the brushless motor 1 has stopped at the corresponding pulled-in position. If the rotor has stopped at the pulled-in position, the routine goes to step S804. However, if the rotor has not stopped, step S803 is repeated until the rotor has stopped at the pulled-in position. In step S804, the pulled-in position at which the rotor is currently at rest is employed as the commutation reference point for use when the carriage 21 is moved in the right direction, and the cumulative value SR for use in moving the carriage 21 in the right direction is set to 1. Furthermore, the cumulative value SL for use in moving the carriage 21 in the left direction is also set to 1. Thereafter, the routine goes to step S805, and automatic switching of the commutation mode in accordance with the cumulative values SR and SL is disabled. The automatic switching operation of the commutation mode will be described later with reference to FIG. 13. In step S806, the commutation mode is forcedly switched once into an opposite direction (in a direction which causes the carriage 21 to move to the left, in this specific example), and the routine goes to step S808. In step S808, counting associated with the cumulative values SR and SL is performed as shown in FIG. 13.

Figure 13:
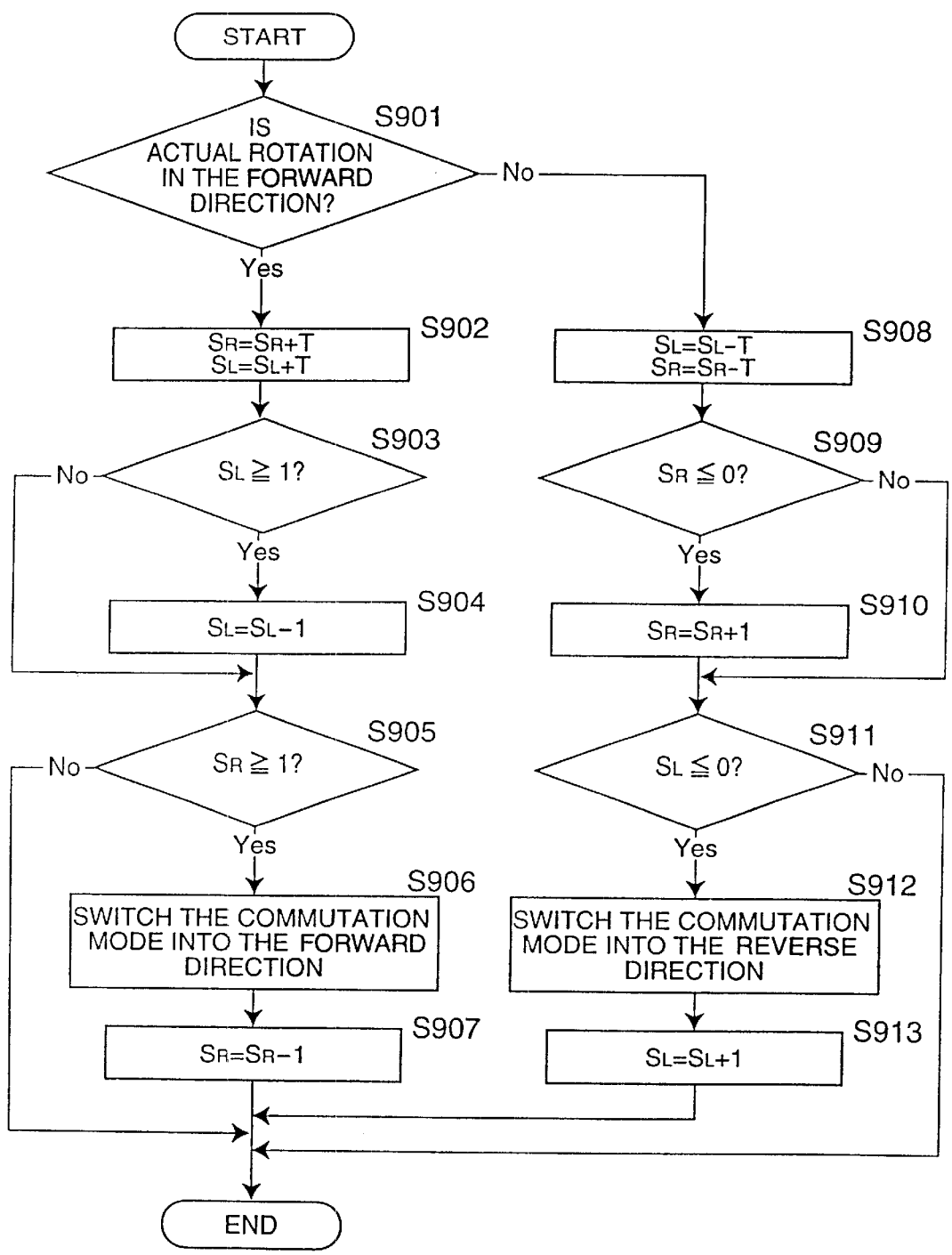
FIG. 13 is a flow chart illustrating an example of a commutation control routine according to the third and fourth embodiments.

In a first step S901 in the counting routine shown in FIG. 13, it is determined, from the two pulse signal, whether the brushless motor 1 is rotating in the forward or reverse direction that is, it is determined whether the carriage 21 is moving in the right or left direction. In the case where the brushless motor 1 is rotating in the forward direction, the predetermined commutation constant T is added to the cumulative values SR and SL, respectively (step S902).

Herein, as in the first embodiment, the commutation constant T is equal to 1/M where M is the number of the encoder pulse edges per commutation interval.

Then in step S903, it is determined whether the cumulative value SL is equal to or greater than "1". If SL is smaller than "1", the routine goes to step S905. On the other hand, if SL is equal to or greater than "1", the routine goes to step S904, and "1" is subtracted from SL. Thereafter, the routine goes to step S905. In step S905, it is determined whether the cumulative value SR is equal to or greater than "1". If SR is smaller than "1", the counting routine shown in FIG. 13 is ended. However, if SR is equal to or greater than "1", it is determined that a timing of commutation has been reached, and the routine goes to step S906. In a normal situation, in this step S906, the commutation mode is switched in the forward direction. However, in this specific case, because the counting routine shown in FIG. 13 is executed in step S808 shown in FIG. 12 and thus the automatic switching of the commutation mode in accordance with the value of SR or SL has been disabled in step S805, the switching of the commutation mode in step S906 is not executed, and the routine goes to step S907. In step S907, "1" is subtracted from the value of SR. Thus, the counting routine shown in FIG. 13 is completed.

In the case where it is determined in step S901 that the brushless motor 1 is rotating in the reverse direction, the routine goes to step S908, and the commutation constant T is subtracted from the respective cumulative values SR and SL. Thereafter, in step S909, it is determined whether the cumulative value SR is equal to or smaller than "0". If the value of SR is greater than "0", the routine goes to step S911. However, if the value of SR is equal to or smaller than "0", the routine goes to step S910, and "1" is added to the value of SR. Thereafter, the routine goes to step S911. In step S911, it is determined whether the cumulative value SL is equal to or smaller than "0". If the value of SL is greater than "0", the counting routine shown in FIG. 13 is ended. However, if the value of SL is equal to or smaller than "0", it is determined that a timing of commutation has been reached, and the routine goes to step S912. In a normal situation, in this step S912, the commutation mode is switched in the reverse direction. However, in this specific case, because the automatic switching of the commutation mode in accordance with the value of SR or SL has been disabled as described above, the routine goes to step S913 without executing the switching of the commutation mode in step S912. In step S913, "1" is added to the value of SL, and the counting routine shown in FIG. 13 is ended.

After completion of step S808 shown in FIG. 12, that is, the routine shown in FIG. 13, the routine goes to step S809 to determine whether the rotor of the brushless motor 1 has stopped at the pulled-in position. If the rotor has not stopped, the routine goes to step S807, and steps S807 to S809 are performed repeatedly until the rotor has stopped at the pulled-in position. That is, the counting of SR and SL is performed such that each time each edge of the encoder pulse signals is detected, the commutation constant T is added to or subtracted from the cumulative value SR or SL, depending upon the rotation direction, and each time the value of SR or SL becomes equal to or greater than "1" or equal to or smaller than "0", "1" is subtracted from or added to the cumulative value SR or SL, depending upon the rotation direction. Note that, in the above process, the commutation mode is not switched regardless of the values of SR and SL.

If it is determined in step S809 that the rotor has stopped at the pulled-in position, this pulled-in position is employed as the commutation reference point for use in moving the carriage 21 in the left direction, and the cumulative value SL is reset. Herein, the cumulative value SL is reset to a different value depending upon the rotation direction specified by the higher-level device after completion of the commutation reference point setting routine. In step S810, the rotation direction specified by the higher-level device is detected. If the forward direction is specified (in this specific example, the forward direction is defined as the direction which causes the carriage 21 to move to in the right), the routine goes to step S811, and the cumulative value SL is set such that SL=0. In the case where it is determined in step S810 that the reverse direction is specified (in this specific example, the reverse direction is defined as the direction which causes the carriage 21 to move to the left), the routine goes to step S812, and the cumulative value SL is set such that SL=1. Thereafter, the routine goes to step S813, and automatic switching of the commutation mode in accordance with the cumulative values SR and SL is enabled, and the commutation reference point setting routine shown in FIG. 12 is ended.

After completion of the commutation reference point setting routine shown in FIG. 12, that is, step S706 shown in FIG. 11, the routine goes to step S707 shown in FIG. 11 to determine whether a start command to start the brushless motor 1 has been issued from the higher-level device. If it is determined in step S707 that a start command has been issued, the routine goes to step S708, and the start routine shown in FIG. 5 is performed in a similar manner as in the first embodiment. Thereafter, the routine goes to step S709. In step S709, if an edge of a pulse signal output from the position detector is detected as a result of movement of the carriage 21, the routine goes to step S710, and a commutation control routine is performed as shown in FIG. 13. In the routine shown in FIG. 13, the commutation mode is switched in the forward direction in step S906 or into the reverse direction in step S912. The other steps in the routine shown in FIG. 13 are the same as the above-described counting routine in step S808 shown in FIG. 12, and thus they are not described in further detail herein. After completion of the commutation control routine in step S710, the routine goes to step S711 to determine whether a main routine end command has been issued from the higher-level device as a result of, for example, turning-off of the power switch of the printer. If the main routine end command has been issued, the main routine shown in FIG. 11 is ended. However, if the main routine end command has not been issued, the routine returns to step S707.

Thereafter, when the carriage 21 is moving, steps S707→S709→S711 are performed repeatedly. During the above iteration, each time each edge of the encoder pulse signals is detected in step S709, step S710 is executed such that the commutation constant T is added to or subtracted from the cumulative value SR or SL, depending upon the rotation direction, and, in the case where the carriage 21 is moving in the right direction, each time the value of SR becomes equal to or greater than "1", the commutation mode is switched, while in the case where the carriage 21 is moving in the left direction, each time the value of SL becomes equal to or smaller than "0", the commutation mode is switched.

When the carriage 21 is at rest, steps S707→S709→S711 in the main routine shown in FIG. 11 are performed repeatedly. When a start command to move the carriage 21, for example in the reverse direction, is issued from the higher-level device, the routine goes from step S707 to step S708, and the commutation control operation is performed in the above-described manner.

In the case where the rotational motion of the brushless motor 1 is converted into linear motion of the belt 23 via pulleys 22a and 22b thereby driving the carriage 21 by the belt 23 as shown in FIG. 2, the length of the path of transmission of the rotational force of the brushless motor 1 to the carriage 21, that is, the length of the corresponding part of the belt 23 becomes different depending upon whether the rotation is in the forward or reverse direction. Therefore, the amount of expansion of the belt 23 varies depending upon the rotation direction. The difference in the transmission paths results in a shift of the absolute position of the carriage 21 corresponding to the position of the rotor.

That is, the absolute position of the rotor corresponding to a certain absolute position of the carriage 21 varies depending upon the rotation direction. To avoid the above problem, in the third embodiment described above, the commutation reference point is separately set for use in rotation in the forward direction and for use in rotation in the reverse direction, and the commutation timing is generated on the basis of the cumulative value SR when the rotation is in the forward direction and on the basis of the cumulative value SL when the rotation is in the reverse direction thereby eliminating an error which would otherwise occur due to the difference in the amount of expansion of the belt and thus preventing the commutation timing from shifting from the correct timing depending upon the direction of rotation of the brushless motor 1 thus ensuring that commutation is performed with correct timings.

Therefore, commutation can be performed with high accuracy even when the carriage becomes impossible to move very smoothly because of aging or for some other reason, or even when the belt becomes easy to expand.

Herein, the cumulative value SR obtained when the cumulative value SL is set such as SL=0 or SL=1 in step S811 or S812 in FIG. 12 may be employed as a reference point error ΔS, and the cumulative value SR may be corrected by adding or subtracting the reference point error ΔS to or from the cumulative value SR each time the rotation direction is switched.

Figure 14:
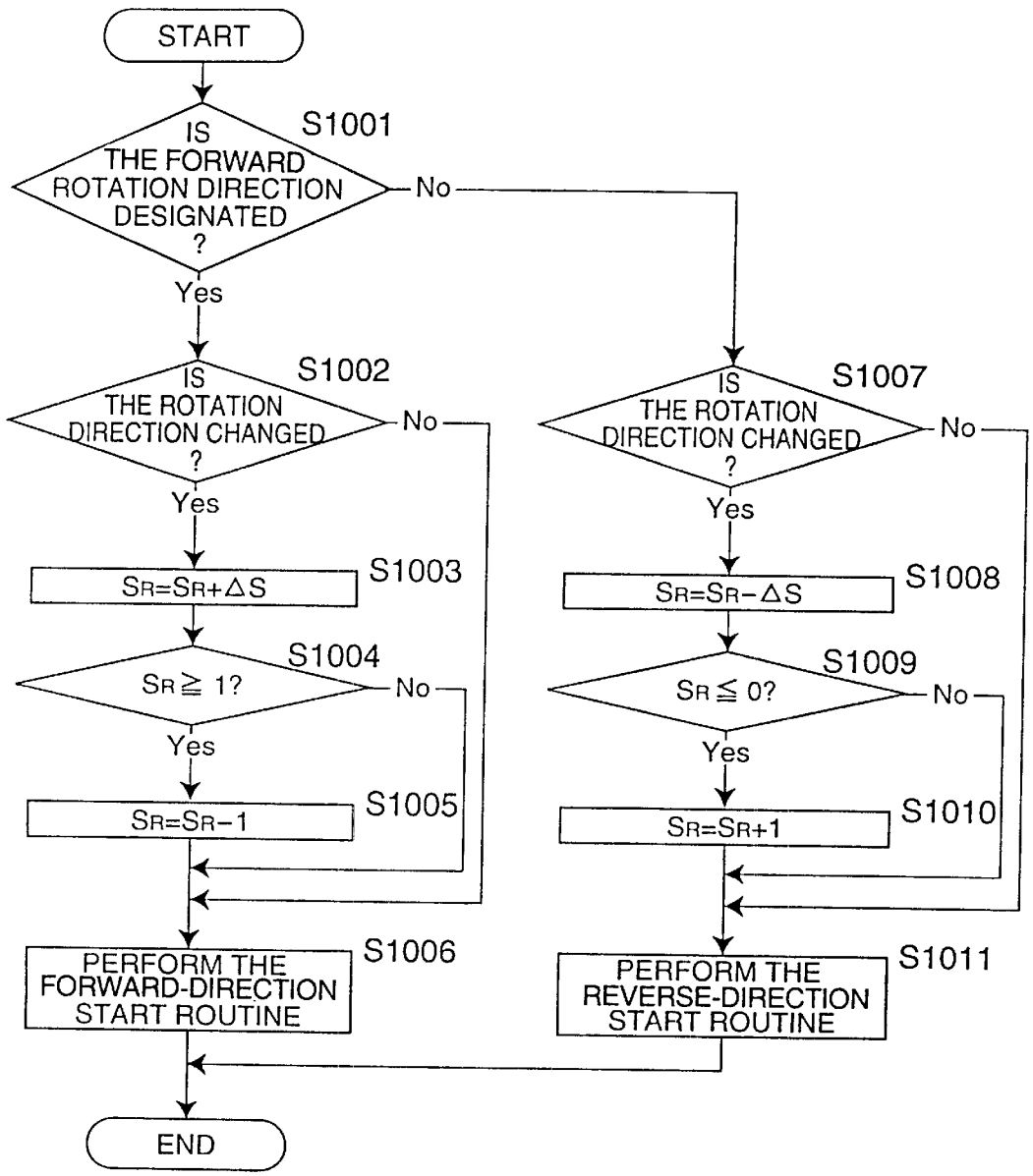
FIG. 14 is a flow chart illustrating an example of a start routine according to the third and fourth embodiments.

In this case, the start routine in step S708 shown in FIG. 11 is performed in such a manner as shown in FIG. 14. In a first step S1001 in the start routine shown in FIG. 14, it is determined which rotation direction is specified by the higher-level device. If the forward rotation direction is specified, the routine goes to step S1002. In step S1002, it is determined whether the specified rotation direction is opposite to an immediately previous rotation direction. If the specified rotation direction is the same as the immediately previous rotation direction, that is, if the rotation should be still in the forward direction as in the immediately previous operation, the routine goes from step S1002 to step S1006 to perform a forward-direction start routine. In the case where the specified rotation direction is opposite to the immediately previous direction, that is, in the case where the rotation direction should be changed from the reverse direction to the forward direction, the routine goes from step S1002 to step S1003, and the reference point error ΔS is added to the cumulative value SR. Thereafter, the routine goes to step S1004 to determine whether the cumulative value SR is equal to or greater than "1". If the cumulative value SR is smaller than "1", the routine goes to step S1006. However, if the cumulative value SR is equal to or greater than "1", the routine goes to step S1005, and "1" is subtracted from the value of SR. Thereafter, the routine goes to step S1006, and the forward-direction start routine is performed. Thereafter, the start routine of FIG. 14 is ended.

In the case where it is determined in step S1001 that the reverse rotation direction is specified by the higher-level device, the routine goes to step S1007. In step S1007, it is determined whether the specified rotational direction is opposite to the immediately previous rotation direction. If the specified rotation direction is the same as the immediately previous rotation direction, that is, if the rotation should be still in the reverse direction as in the immediately previous operation, the routine goes from step S1007 to step S1011 to perform a reverse-direction start routine. On the other hand, if the specified rotation direction is opposite to the immediately previous direction, that is, if the rotation direction should be changed from the forward direction to the reverse direction, the routine goes from step S1007 to step S1008, and the reference point error AS is subtracted from the value of SR. Thereafter, in step S1009, it is determined whether the cumulative value SR is equal to or smaller than "0". If the cumulative value SR is greater than "0", the routine goes to step S1011. However, if the cumulative value SR is equal to or smaller than "0", the routine goes to step S1010, and "1" is added to the value of SR. Thereafter, the routine goes to step S1011. In step S1011, the reverse-direction start routine is performed. After the completion of the reverse-direction start routine in step S1011, the start routine shown in FIG. 14 is ended.

After the completion of the above process, the following commutation control can be performed simply by replacing the cumulative value S with SR in the commutation control routine shown in FIG. 7. That is, each time the rotation direction is switched, the cumulative value SR is corrected by the reference point error ΔS, and thus the commutation control routine can be performed in a simplified manner.

A fourth embodiment of the present invention is described below.

The fourth embodiment is similar to the second embodiment described above except that the commutation control circuit 12 operates differently, and thus similar parts to those in the second embodiment are denoted by similar reference numerals, and they are not described in further detail herein.

In this fourth embodiment, as in the third embodiment described above, two commutation reference points are used, one of which is used when the carriage 21 is moved in the right direction, and the other one of which is used when the carriage 21 is moved in the left direction, and the two commutation reference points are reset on the basis of zero-crossing of a counter electromotive voltage which is generated in a non-exciting phase of the stator coils of the brushless motor 1 and which is detected by the zero-crossing detection circuit 13.

Figure 15:
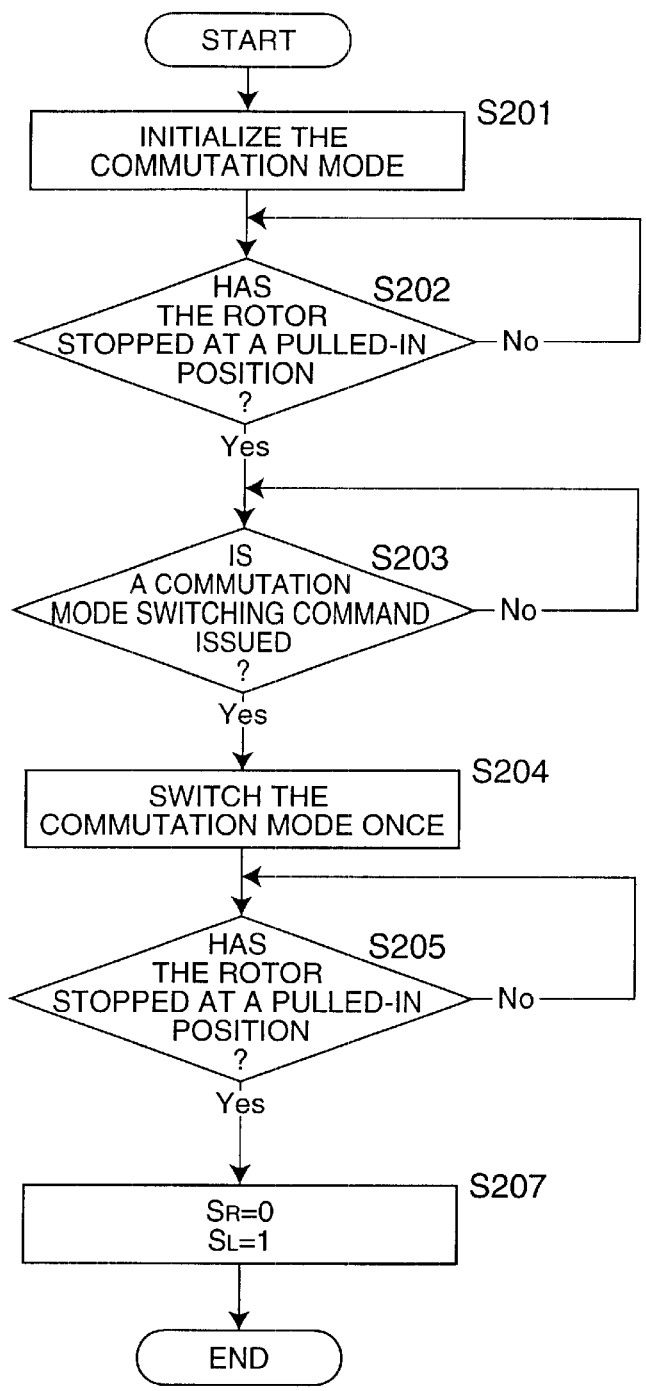
FIG. 15 is a flow chart illustrating an example of a commutation reference point setting routine according to the fourth embodiment.

When the power switch of the printer is turned on and thus the control circuit 10 is activated, the commutation control circuit 12 first starts the main routine shown in FIG. 3 as in the first embodiment. In step S101, a commutation reference point setting routine shown in FIG. 15 is performed. In the commutation reference point setting routine shown in FIG. 15, as in the commutation reference point setting routine according to the first embodiment described above with reference to FIG. 4, pulling-in of the rotor is performed twice in steps S201 to S205. If it is determined in step S205 that the rotor has stopped at a pulled-in position, the routine goes from step S205 to step S207. In step S207, the cumulative value SR used in the commutation control when the carriage 21 is moved in the right direction is set to "0", and the cumulative value SL used in the commutation control when the carriage 21 is moved in the left direction is set to "1", and thus the commutation reference point is set. Thereafter, the routine goes to step 102. In step S102, if a start command to start the brushless motor 1 is issued by the higher-level device, the routine goes to step S103, and the start routine shown in FIG. 5 is performed as in the first embodiment. If an edge of a pulse signal, which is output from the position detector 15 in response to the movement of the carriage 21, is detected (step S104), the routine goes to step S105, and a commutation control routine shown in FIG. 16 is performed.

Figure 16:
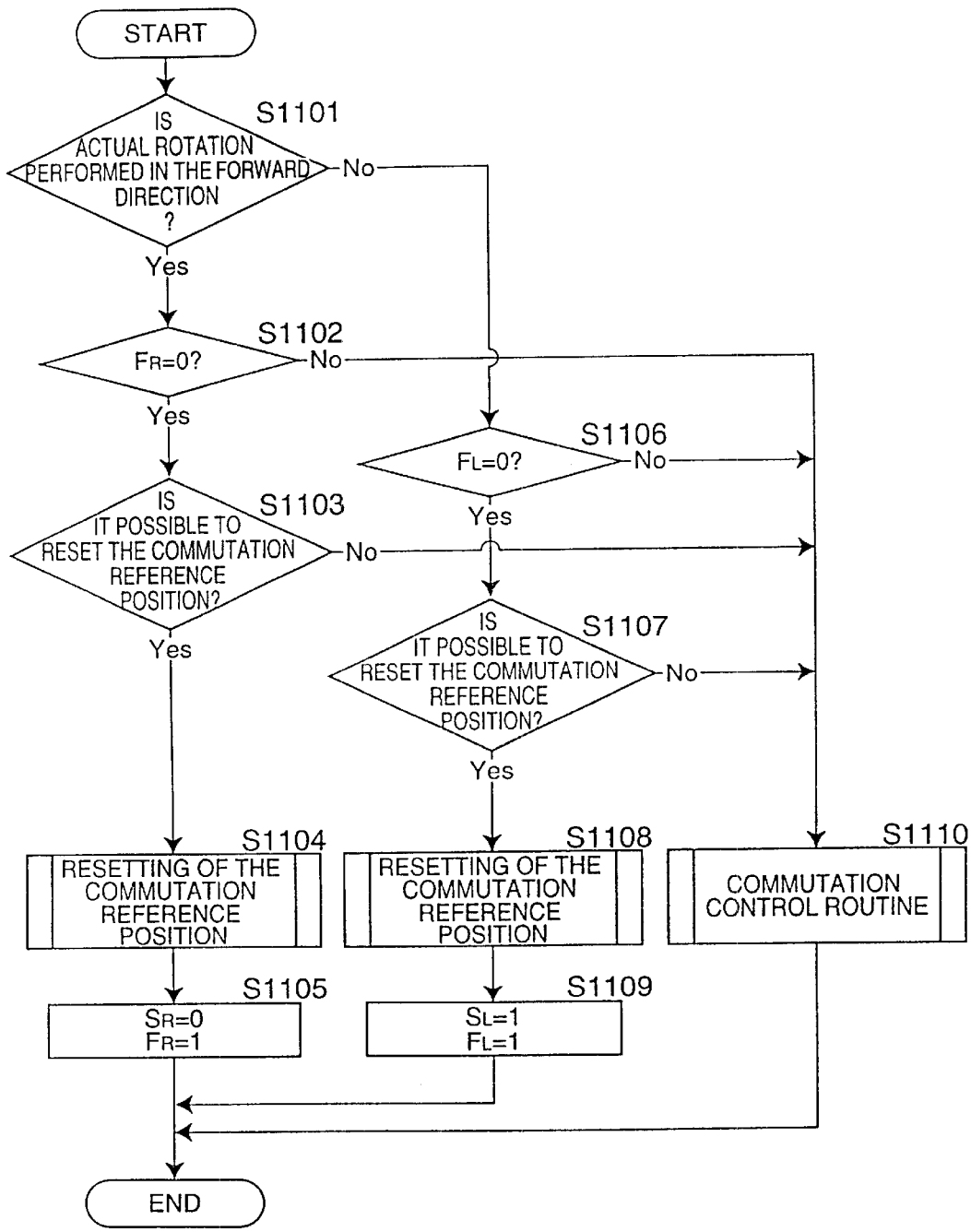
FIG. 16 is a flow chart illustrating an example of a commutation control routine according to the fourth embodiment.

In the commutation control routine shown in FIG. 16, a right-direction commutation reference point reset flag FR and a left-direction commutation reference point reset flag FL are referred to. FR has a value of "1" when resetting of the commutation reference point used when the carriage 21 is moved in the right direction has been completed, while FR has a value of "0" if the resetting is not completed. FL has a value of "1" when resetting of the commutation reference point used when the carriage 21 is moved in the left direction has been completed, while FL has a value of "0" if the resetting is not completed. In the first-time start operation, both FR and FL are set to "0". First, in step S1101, it is determined whether the rotation of the brushless motor 1 is presently in the forward direction. If the rotation is in the forward direction (which is defined in this specific embodiment as the direction causing the carriage 21 to move to the right), the routine goes to step S1102, however, if the rotation is in the reverse direction (which is defined in this specific embodiment as the direction causing the carriage 21 to move to the left), the routine goes to step S1106. In the case where the rotation is in the forward direction, it is determined in step S1102 whether the value of FR is equal to "0". If the value of FR is equal to "0", that is, if the resetting of the right-direction commutation reference point is not completed, the routine goes to step S1103. In step S1103, it is determined whether the resetting of the commutation reference point is possible in a similar manner as is described in the second embodiment. In the case where the resetting of the commutation reference point on the basis of the counter electromotive voltage is not possible because the rotation speed of the brushless motor 1 is low, the routine goes from step S1103 to step S1110, and the commutation control routine shown in FIG. 13 is performed in a similar manner as is described in the third embodiment. That is, each time each edge of the encoder pulse signals is detected the commutation constant T is added to or subtracted from the cumulative value SR or SL, depending upon the rotation direction, and, in the case where the carriage 21 is moving in the right direction, each time the value of SR becomes equal to or greater than "1", the commutation mode is switched, while in the case where the carriage 21 is moving in the left direction, each time the value of SL becomes equal to or smaller than "0", the commutation mode is switched.

When the rotation speed of the brushless motor 1 has increased to a level high enough to detect a counter electromotive voltage, the routine goes from step S1103 to S1104 to perform the commutation reference point resetting routine shown in FIG. 10 in a similar manner as described in the second embodiment. In the commutation reference point resetting routine shown in FIG. 10, at a point of time at which a phase is delayed by one-half of one commutation interval from a zero-crossing of the counter electromotive voltage, a commutation timing is generated (steps S601 to S608 in FIG. 10), and the commutation reference point is reset at this commutation timing. That is, the routine goes from step S1104 in FIG. 16 to step S1105, and the right-direction cumulative value SR is reset to "0", and the value of FR is set to "1" to indicate that the resetting of the right-direction commutation reference point has been completed.

In the case where it is determined in step S1101 that the rotation is in the reverse direction, the routine goes to step S1106 to determine whether the value of FL is equal to "0". If the value of FL is equal to "0", that is, if the resetting of the left-direction commutation reference point has not been completed, the routine goes to step S1107. In step S1107, it is determined whether the resetting of the commutation reference point is possible in a similar manner as in step S1103. In the case where the resetting of the commutation reference point on the basis of the counter electromotive voltage is not possible, the routine goes from step S1107 to S1110, and the commutation control routine shown in FIG. 13 is performed. On the other hand, if the resetting of the commutation reference point is possible, the routine goes from step S1107 to step S1108, and the resetting of the commutation reference point shown in FIG. 10 is performed in a similar manner to step S1104. Thereafter, the routine goes to step S1109, and the left-direction cumulative value SL is reset to "1", and furthermore the value of FL is set to "1" to indicate that the resetting of the left-direction commutation reference point has been completed.

After the resetting of the commutation reference point on the basis of the counter electromotive force has been completed for both the right and the left directions and thus the values of both FR and FL have been set to "1", in the routine shown in FIG. 3 (steps S104 and S105), each time an edge of an encoder pulse is detected, the routine goes from step S1102 or step S1106 in FIG. 16 to step S1110, and the commutation control routine shown in FIG. 13 is performed as in the third embodiment described above.

In this fourth embodiment, as descried above, the commutation reference point is separately provided for use with rotation in the forward direction and for use with rotation in the reverse direction, and the respective commutation reference points are reset in synchronization with the commutation timing generated on the basis of the counter electromotive voltage. Thus, in this fourth embodiment, the advantages obtained in both the second and third embodiments are achieved. That is, even in the case where the position of the rotor corresponding to the position of the carriage 21 varies depending upon the rotation direction due to the expansion of the belt, the timing error of commutation can be controlled within the range corresponding to one interval of the encoder pulse edges output from the position detector 15 regardless of the rotation direction. Therefore, commutation can be performed with high accuracy in both forward and reverse directions, even when the carriage becomes impossible to move very smoothly because of aging or for some other reason, or even when the belt becomes easy to expand. This makes it possible to reduce a torque ripple and a fluctuation of the rotation speed during a fixed-speed operation.

In the embodiments described above, the timing of performing commutation of the motor used to move the carriage is detected on the basis of the pulse signals output from the encoder (position detector) disposed on the carriage of the printer, the present invention is not limited to such a detection technique, but other position detection techniques may also be employed as long as the position detector can output a pulse signal corresponding to the amount of movement of the object to be driven.

Furthermore, a sensor such as a potentiometer may be used to detect the position of the object to be driven. In this case, a pulse generator is provided such that when the position information output from the potentiometer indicates that the object being driven has moved a predetermined distance, the pulse generator outputs one pulse, and controlling is performed in a similar manner to one of the embodiments described above on the basis of the pulse signal output from the pulse generator thereby achieving advantages similar to those obtained in the embodiments described above.

Although in the embodiments described above, commutation is controlled on the basis of the detection signal output from the position detector 15, not only the commutation but also the speed or the phase may also be controlled on the basis of the detection signal output from the position detector 15.

Furthermore, although the present invention is applied to a DC brushless motor in the embodiments described above, the invention is not limited to DC brushless motors. The invention may also be applied to other types of motors such as a stepper motor. Still furthermore, although a linear encoder is employed as an encoder in the embodiments described above, other types of encoders such as an optical encoder or a magnetic encoder may also be employed.

Still furthermore, although the invention is applied to a 3-phase brushless motor in the embodiments described above, the invention may also be applied to other types of brushless motors such as a single-phase brushless motor, a 2-phase brushless motor, a 4-phase brushless motor, or brushless motors having a greater number of phases.

Still furthermore, although in the embodiments described above, the zero-crossing detection circuit 13 detects counter electromotive force of one of phases and detects zero-crossing on the basis of the detected counter electromotive force, the zero-crossing may be detected for all phases. However, there is no significant difference in accuracy between the zero-crossing detected for one phase and that detected for all phases, and thus detection for one phase is more advantageous in that the zero-crossing can be detected by simpler processing with a simpler construction.

In the embodiments described above, the resetting of the commutation reference point is performed when the rotation speed of the brushless motor 1 becomes high enough to detect zero-crossing of the counter electromotive voltage. This may also be achieved, for example, as follows. After the driver circuit 10 is activated, the brushless motor 1 is rotated to perform the resetting of the commutation reference point. After completion of the resetting of the commutation reference point, driving control is started in response to a command signal output from the higher-level device. The resetting of the commutation reference point may be performed not only when the driver circuit 10 is started, but also in predetermined intervals of time after starting to drive the brushless motor 1 so as to eliminate the influence of a change in temperature caused by the driving of the brushless motor 1. This makes it possible to eliminate a commutation reference point error due to temperature changes. Instead of resetting the commutation reference point in predetermined intervals of time, the resetting may be performed when a predetermined period of time has elapsed and thus the change in temperature has reached an equilibrium state.

The resetting of the commutation reference point may also be performed each time the rotation speed of the brushless motor 1 becomes high enough to detect the commutation timing after the brushless motor 1 is started.

A commutation reference point error ΔS may be measured and stored in a storage area such as a ROM in advance, and, after setting the commutation reference point for use in driving in one rotation direction, the cumulative value S obtained with reference to that commutation reference point may be corrected on the basis of the commutation reference point error ΔS each time the rotation direction is switched.

As described above, when the sensorless motor is started for the first time, phase excitation is performed twice switching the excited phase such that a pulled-in position resulting from the first-time excitation and that resulting from second-time excitation become different in electrical angle from each other by a magnitude not equal to either 180° or an integral multiple of 180°, and the commutation reference point is set at a position at which a rotor of the motor has stopped after the second-time excitation. Thereafter, commutation is controlled on the basis of the commutation reference point set in the above-described manner. Thus, high-precision controlling of commutation is achieved.

In the sensorless motor driving apparatus commutation reference points are set for the respective rotation directions so as to prevent commutation timings from shifting from the correct timings depending upon the direction of rotation. Furthermore, an offset value indicating the number of pulses corresponding to the difference in commutation timing between the rotation directions is detected, and the number of pulses is counted with reference to the commutation reference point set for one of the rotation directions and the counted value of pulses is corrected on the basis of the offset value each time the rotation direction is switched. This makes it unnecessary to use two counting variables for the respective rotation directions.

In the sensorless motor driving apparatus, when it becomes possible to generate a commutation timing on the basis of the counter electromotive force induced in a non-exciting phase, the position of the rotor is detected more precisely on the basis of the counter electromotive force, and a commutation timing is generated and resetting of the commutation reference point is performed on the basis of the detected position of the rotor, thereby ensuring that commutation is controlled more precisely. The commutation timing is generated on the basis of the counter electromotive force not of all phases of the sensorless motor but of one of phases. This allows the counter electromotive force to be detected with a fewer number of circuits, and also allows the commutation timing to be generated by simpler processing.

In the sensorless motor driving apparatus, the commutation timing generating means generates commutation timings for the respective rotation directions of the brushless motor, and the commutation reference points for the respective rotation directions are reset at points of time of the respective commutation timings thereby preventing the commutation timings from shifting from the correct timings depending upon the direction of rotation. The offset value, which indicates the number of pulses corresponding to the difference in position between the commutation reference points set for the respective rotation directions of the sensorless motor, is detected and stored in the storage means. After resetting the commutation reference points, the number of pulses is counted with respect to one of the commutation reference points, and the counted value of pulses is corrected on the basis of the offset value stored in the storage means each time the rotation direction is switched, so that the corrected counted value represents the number with respect to the commutation reference point corresponding to the present rotation direction. This makes it unnecessary to use two counting variables for the respective rotation directions.

In the sensorless motor driving apparatus, the resetting of the commutation reference point on the basis of the commutation timing generated by the commutation timing generating means is performed when the control of the sensorless motor is started. This makes it possible to precisely control commutation substantially immediately after starting the control of the sensorless motor. Furthermore, the resetting of the commutation reference point may be performed when a predetermined period of time has elapsed since the controlling of the sensorless motor was started, thereby eliminating the influence of the change in the ambient temperature upon the commutation reference point. The resetting of the commutation reference point may also be performed in predetermined intervals of time after the controlling of the sensorless motor is started, thereby eliminating the influence of the change in the ambient temperature upon the commutation reference point thus maintaining high accuracy of the commutation reference point. Furthermore, the resetting of the commutation reference point may also be performed each time the sensorless motor is started so that the commutation reference point is correctly set depending upon the conditions when the sensorless motor is started.

What is claimed is:

1. A sensorless motor driving apparatus comprising:
   a position detector for outputting a pulse signal in response to movement of an object driven by a sensorless motor;
   commutation control means which counts the number of pulses output from said position detector and controls the commutation of said sensorless motor depending upon the counted value; and
   commutation reference point setting means for setting a commutation reference point employed as a reference point in the counting of said pulses;
   wherein, when said sensorless motor is started for a first time, said commutation reference point setting means performs phase excitation twice switching the excited phase such that a pulled-in position resulting from a first-time excitation and that resulting from a second-time excitation become different in electrical angle from each other by a magnitude not equal to either 180° or an integral multiple of 180°, and said commutation reference point setting means performs a setting of said commutation reference point when a rotor of said motor has stopped after the second-time excitation.

2. A sensorless motor driving apparatus according to claim 1, wherein said commutation reference point setting means sets said commutation reference point for each rotation direction of said sensorless motor, and wherein said commutation control means controls the commutation depending upon a present rotation direction in accordance with the number of pulses as counted starting from the commutation reference point set for the present rotation direction.

3. A sensorless motor driving apparatus according to claim 2, wherein said commutation reference point setting means detects an offset value indicating the number of pulses corresponding to a difference in position between the commutation reference points set for the respective rotation directions of said sensorless motor, and wherein said commutation control means counts the pulses with respect to one of the commutation reference points and corrects the counted value of pulses on a basis of said offset value each time the rotation direction is switched.

4. A sensorless motor driving apparatus according to claim 1, further comprising:
   counter electromotive force detection means for detecting a counter electromotive force induced in a non-exciting phase of said sensorless motor; and
   commutation timing generating means for generating a commutation timing in accordance with the counter electromotive force detected by said counter electromotive force detection means,
   wherein said commutation reference point setting means resets said commutation reference point at a point of time of the commutation timing generated by said commutation timing generating means.

5. A sensorless motor driving apparatus according to claim 4, wherein said commutation timing generating means generates a commutation timing in accordance with the counter electromotive force of one of the phases of said sensorless motor.

6. A sensorless motor driving apparatus according to claim 4, wherein said commutation timing generating means generates a commutation timing for each rotation direction of said sensorless motor, and wherein said commutation reference point setting means resets the commutation reference points for the respective rotation directions in accordance with the corresponding commutation timings generated for the respective rotation directions.

7. A sensorless motor driving apparatus according to claim 6, wherein said commutation reference point setting means detects an offset value indicating the number of pulses corresponding to a difference in position between the commutation reference points reset in accordance with the commutation timings generated for the respective rotation directions by said commutation timing generating means, and said commutation reference point setting means includes storage means for storing said offset value, and wherein said commutation control means counts pulses with respect to one of the reset commutation reference points and corrects the counted value of pulses on the basis of the offset value stored in said storage means each time the rotation direction is switched.

8. A sensorless motor driving apparatus according to claim 4, wherein when controlling of said sensorless motor is started, said commutation control means performs the resetting of a commutation reference point in accordance with a commutation timing generated by said commutation timing generating means.

9. A sensorless motor driving apparatus according to claim 4, wherein when a predetermined period of time has elapsed since controlling of said sensorless motor was started, said commutation control means performs the resetting of a commutation reference point in accordance with a commutation timing generated by said commutation timing generating means.

10. A sensorless motor driving apparatus according to claim 4, wherein each time a predetermined period of time elapses after controlling of said sensorless motor was started, said commutation control means performs the resetting of a commutation reference point in accordance with a commutation timing generated by said commutation timing generating means.

11. A sensorless motor driving apparatus according to claim 4, wherein each time said sensorless motor is started, said commutation control means performs the resetting of a commutation reference point in accordance with a commutation timing generated by said commutation timing generating means.

12. A method of controlling a sensorless motor driving apparatus including a brushless motor, an inverter, a commutation control circuit, and a carriage that includes a position detector for detecting position of said carriage, the method comprising:

controlling commutation of said brushless motor on the basis of pulse signals output from said position detector;

performing an initial pulling-in operation in said commutation control circuit to determine a commutation reference point;

performing a phase excitation twice switching the excitation such that a pulled-in position resulting from a first-time excitation and that resulting from a second-time excitation become different in electrical angle from each other by a magnitude not equal to either 180° or an integral multiple of 180°; and setting said commutation reference point when a rotor of said motor has stopped after the second-time excitation.

13. The method according to claim 12 further comprising:

monitoring a counter electromotive voltage of a phase of said motor by a zero-crossing detection circuit; and generating a commutation timing by said commutation control circuit on the basis of detection of said counter electromotive voltage and resetting said commutation reference point on the basis of the commutation timing.

14. The method according to claim 12, wherein a first commutation reference point is used when said carriage is moved in a direction to the right and a second commutation reference point is used when said carriage is moved in a direction to the left.

15. The method according to claim 13, wherein a first commutation reference point is used when said carriage is moved in a direction to the right and a second commutation reference point is used when said carriage is moved in a direction to the left.

* * * * *

UNITED STATES PATENT AND TRADEMARK OFFICE
CERTIFICATE OF CORRECTION

PATENT NO. : 6,483,266 B2
DATED : November 19, 2002
INVENTOR(S) : Miyazaki et al.

It is certified that error appears in the above-identified patent and that said Letters Patent is hereby corrected as shown below:

Column 11,
Line 49, after "case" insert -- where --

Column 16,
Line 60, delete "in"

Column 18,
Line 66, "AS" should be -- Δ S --

Signed and Sealed this

Eighteenth Day of May, 2004

JON W. DUDAS
*Acting Director of the United States Patent and Trademark Office*